United States Patent
Logan et al.

(10) Patent No.: US 10,961,843 B2
(45) Date of Patent: Mar. 30, 2021

(54) SYSTEM AND METHOD FOR DATA TELEMETRY AMONG ADJACENT BOREHOLES

(71) Applicant: EVOLUTION ENGINEERING INC., Calgary (CA)

(72) Inventors: Aaron W. Logan, Calgary (CA); Kurtis K. L. West, Calgary (CA); Jason B. Wackett, Didsbury (CA); Vincent Raymond Martin, Calgary (CA); Mahdi Yousefi Koopaei, Calgary (CA)

(73) Assignee: Evolution Engineering Inc., Calgary (CA)

( * ) Notice: Subject to any disclaimer, the term of this patent is extended or adjusted under 35 U.S.C. 154(b) by 0 days.

(21) Appl. No.: 16/466,101

(22) PCT Filed: Dec. 22, 2017

(86) PCT No.: PCT/CA2017/051606
§ 371 (c)(1),
(2) Date: Jun. 3, 2019

(87) PCT Pub. No.: WO2018/119520
PCT Pub. Date: Jul. 5, 2018

(65) Prior Publication Data
US 2019/0353031 A1      Nov. 21, 2019

Related U.S. Application Data

(60) Provisional application No. 62/440,618, filed on Dec. 30, 2016.

(51) Int. Cl.
*E21B 47/13*     (2012.01)
*H04B 13/02*     (2006.01)
(Continued)

(52) U.S. Cl.
CPC .............. *E21B 47/13* (2020.05); *E21B 47/14* (2013.01); *G01S 5/02* (2013.01); *G01S 11/06* (2013.01);
(Continued)

(58) Field of Classification Search
None
See application file for complete search history.

(56) References Cited

U.S. PATENT DOCUMENTS 5,725,059 A    3/1998  Kuckes et al.
6,483,310 B1   11/2002 Meador
(Continued)

FOREIGN PATENT DOCUMENTS

CA    2968582 A1    9/2016
EP    0918136 A1    5/1999
(Continued)

OTHER PUBLICATIONS

Savvides, A. et al., "Dynamic Fine-Grained Localization in Ad-Hoc Networks of Sensors", May 5, 2001, https://escholarship.org/uc/item/6xs0j41x.

*Primary Examiner* — Curtis A Kuntz
*Assistant Examiner* — Jerold B Murphy
(74) *Attorney, Agent, or Firm* — Oyen Wiggs Green & Mutala LLP

(57) ABSTRACT

An active downhole antenna located in a borehole receives electromagnetic (EM) telemetry transmissions from sources in adjacent boreholes. The antenna comprises a processor operable do decode and measure signal to noise ratio of received transmissions. Data received at the active antenna is transmitted to surface using a high-speed data communication network. The active antenna may handle data communications from multiple downhole EM telemetry transmitters.

43 Claims, 13 Drawing Sheets

(51) Int. Cl.
*H04B 17/309* (2015.01)
*E21B 47/14* (2006.01)
*G01S 5/02* (2010.01)
*G01S 11/06* (2006.01)
*H04L 1/00* (2006.01)

(52) U.S. Cl.
CPC ........... *H04B 13/02* (2013.01); *H04B 17/309* (2015.01); *H04L 1/0045* (2013.01); *H04L 1/0061* (2013.01)

(56) References Cited

U.S. PATENT DOCUMENTS

| | | |
|---|---|---|
| 6,859,761 B2 | 2/2005 | Bensky et al. |
| 8,912,915 B2 | 12/2014 | Hay et al. |
| 9,366,780 B2 | 6/2016 | Wisler et al. |
| 9,459,371 B1 | 10/2016 | Holmen et al. |
| 9,732,559 B2 * | 8/2017 | Bittar ............... E21B 47/02216 |
| 10,400,585 B2 * | 9/2019 | Down ..................... E21B 47/12 |
| 2004/0088115 A1 | 5/2004 | Guggari et al. |
| 2009/0101356 A1 | 4/2009 | Johnson |
| 2011/0017512 A1 * | 1/2011 | Codazzi ................ E21B 47/122 175/40 |
| 2012/0139748 A1 * | 6/2012 | Hay ..................... G01V 11/002 340/854.1 |
| 2015/0002306 A1 | 1/2015 | Hay et al. |
| 2016/0252645 A1 | 9/2016 | Wisler et al. |
| 2016/0273344 A1 | 9/2016 | Wu et al. |
| 2018/0038225 A1 * | 2/2018 | Wilson .................. E21B 47/123 |

FOREIGN PATENT DOCUMENTS

| | | |
|---|---|---|
| GB | 2394296 B | 4/2005 |
| WO | 2011090698 A1 | 7/2011 |
| WO | 2014105051 A1 | 7/2014 |
| WO | 2014120556 A1 | 8/2014 |
| WO | 2014183187 A1 | 11/2014 |
| WO | 2015077552 A2 | 5/2015 |
| WO | 2016033178 A1 | 3/2016 |
| WO | 2016108904 A1 | 7/2016 |

* cited by examiner

SYSTEM AND METHOD FOR DATA TELEMETRY AMONG ADJACENT BOREHOLES

CROSS-REFERENCE TO RELATED APPLICATION

This application claims priority from U.S. Patent Application No. 62/440,618 filed 30 Dec. 2016. For purposes of the United States, this application claims the benefit under 35 U.S.C. § 119 of U.S. Patent Application No. 62/440,618 filed 30 Dec. 2016 and entitled SYSTEM AND METHOD FOR DATA TELEMETRY AMONG ADJACENT BOREHOLES which is hereby incorporated herein by reference for all purposes.

TECHNICAL FIELD

This application relates to subsurface drilling, specifically to data telemetry. Embodiments provide systems and methods for communicating information such as well logging information, measurement while drilling information between downhole tools and surface equipment. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at the surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such systems may comprise any active mechanical, electronic, and/or electromechanical system that operates downhole. Such systems may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. Data may be obtained from sensors that may include one or more of vibration sensors, magnetometers, inclinometers, accelerometers, nuclear particle detectors, electromagnetic detectors, acoustic detectors, and others; acquiring images; measuring fluid flow; determining directions; devices that emit signals, particles or fields for detection by other devices; etc.

Data may be transferred in one or both directions between downhole equipment and surface equipment by one or more telemetry systems. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster data rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe.

A typical arrangement for electromagnetic telemetry uses parts of the drill string as an antenna. The drill string may be divided into two conductive sections by including an insulating joint or connector (a "gap sub") in the drill string. The gap sub is typically placed at the top of a bottom hole assembly such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that codes information for transmission to the surface. Higher frequency signals attenuate faster than low frequency signals. The electromagnetic signals may be detected at the surface, for example, by measuring electrical potential differences between the drill string or a metal casing that extends into the ground and one or more ground rods.

There remains a need for more reliable and cost-effective ways to maintain data communications between downhole and surface equipment and a need for high data rate telemetry for applications such as automated drilling, data intensive logging and the like.

SUMMARY

The present invention has a number of aspects that may be used together, individually or in any suitable combinations.

Some aspects relate to systems and methods for receiving and/or transmitting EM telemetry signals that are deployable in one wellbore and may be used to provide EM telemetry communications with downhole tools in one or more other wellbores. Some such systems and methods perform various signal processing functions at downhole locations. Some aspects relate to the use of EM telemetry signals in determining the relative locations and trajectories of wellbores. Some aspects relate to the use of signal transmitters and/or receivers within a borehole (the transmitted and received signals may comprise electromagnetic and/or acoustic signals, for example) to estimate a trajectory of the borehole. Some aspects relate to the use of EM telemetry signals for determining characteristics of underground formations. Some aspects relate to sharing data acquired in plural wellbores. The data may be useful for proactive adjustment of drilling parameters. Some aspects relate to delivering downlink telemetry signals to downhole tools.

Further aspects of the invention and features of example embodiments are illustrated in the accompanying drawings and/or described in the following description.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
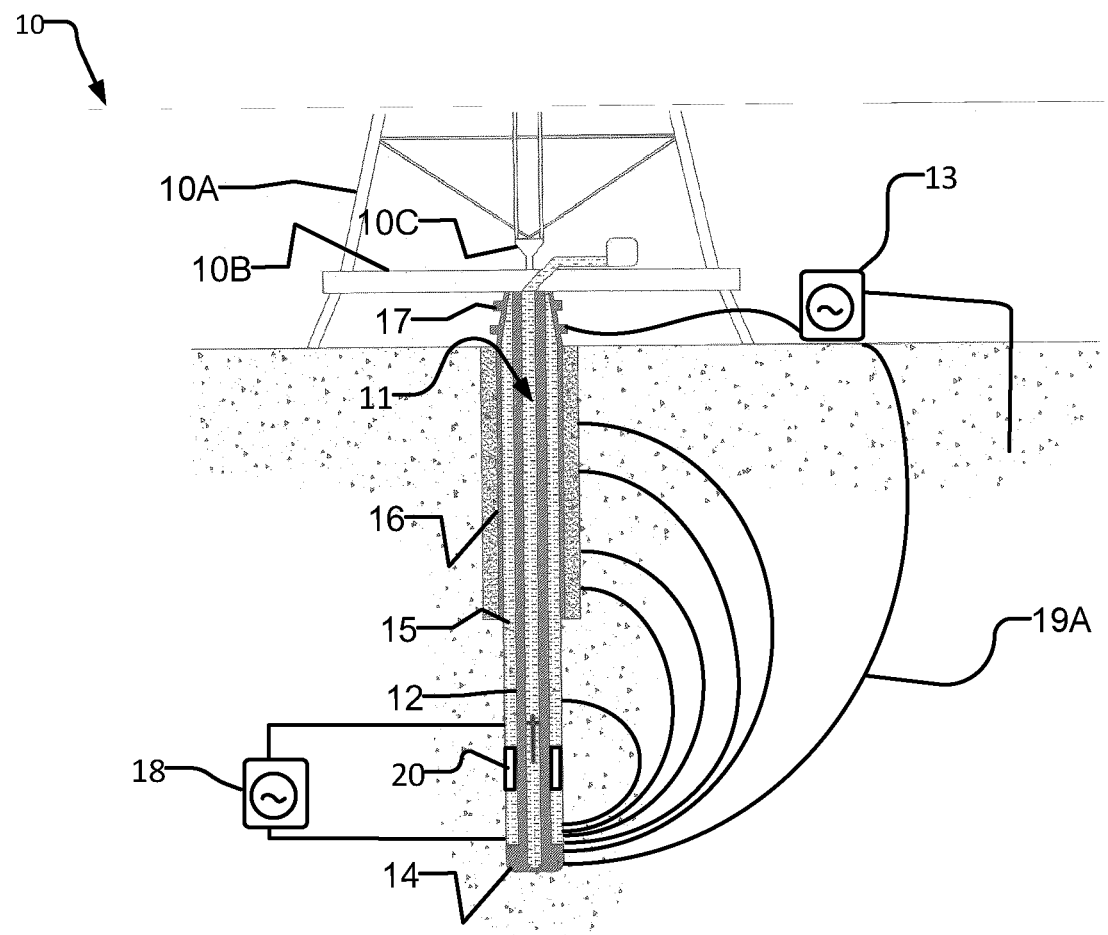
FIG. 1 is a schematic view of a drilling operation.

FIG. 1 shows schematically an example drilling operation. A drill rig 10 drives a drill string 12 which includes sections of drill pipe that extend through a borehole 11 to a drill bit 14. The illustrated drill rig 10 includes a derrick 10A, a rig floor 10B and draw works 10C for supporting the drill string.

Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

Drill string 12 includes a downhole tool 13 comprising an electromagnetic (EM) telemetry transmitter or transceiver. In some embodiments the EM transmitter transmits EM signals by way of a gap sub 20. Gap sub 20 may be positioned, for example, at or near an uphole end of the BHA. Gap sub 20 divides the drill string into two electrically-conductive parts that are electrically insulated from one another. The two parts form a dipole antenna structure. For example, one part of the dipole may be made of the BHA up to the electrically insulating gap and the other part of the dipole may be made up of the part of the drill string extending from the gap toward the surface.

A very low frequency alternating current (AC) electrical signal 19A is generated by an EM telemetry signal generator 18 and applied across gap sub 20. The low frequency AC signal energizes the earth and creates an electrical field 19A which propagates through the earth. Such EM telemetry signals are typically detected by surface equipment that detects a measurable voltage differential between the top of drill string 12 and one or more grounded electrodes (such as ground rods or ground plates). Electrical signal 19A is varied in a way which encodes information for transmission by telemetry.

A challenge in implementing an EM telemetry system is that EM transmission is strongly attenuated over long distances through the earth formations. This is a particular challenge when it is desired to use EM telemetry at large depths, particularly in drilling deep horizontal sections of a wellbore. The attenuation of EM signals depends significantly on the types of formation through which those signals propagate. Formations that have high electrical conductivity can attenuate EM telemetry transmissions very strongly.

Figure 2:
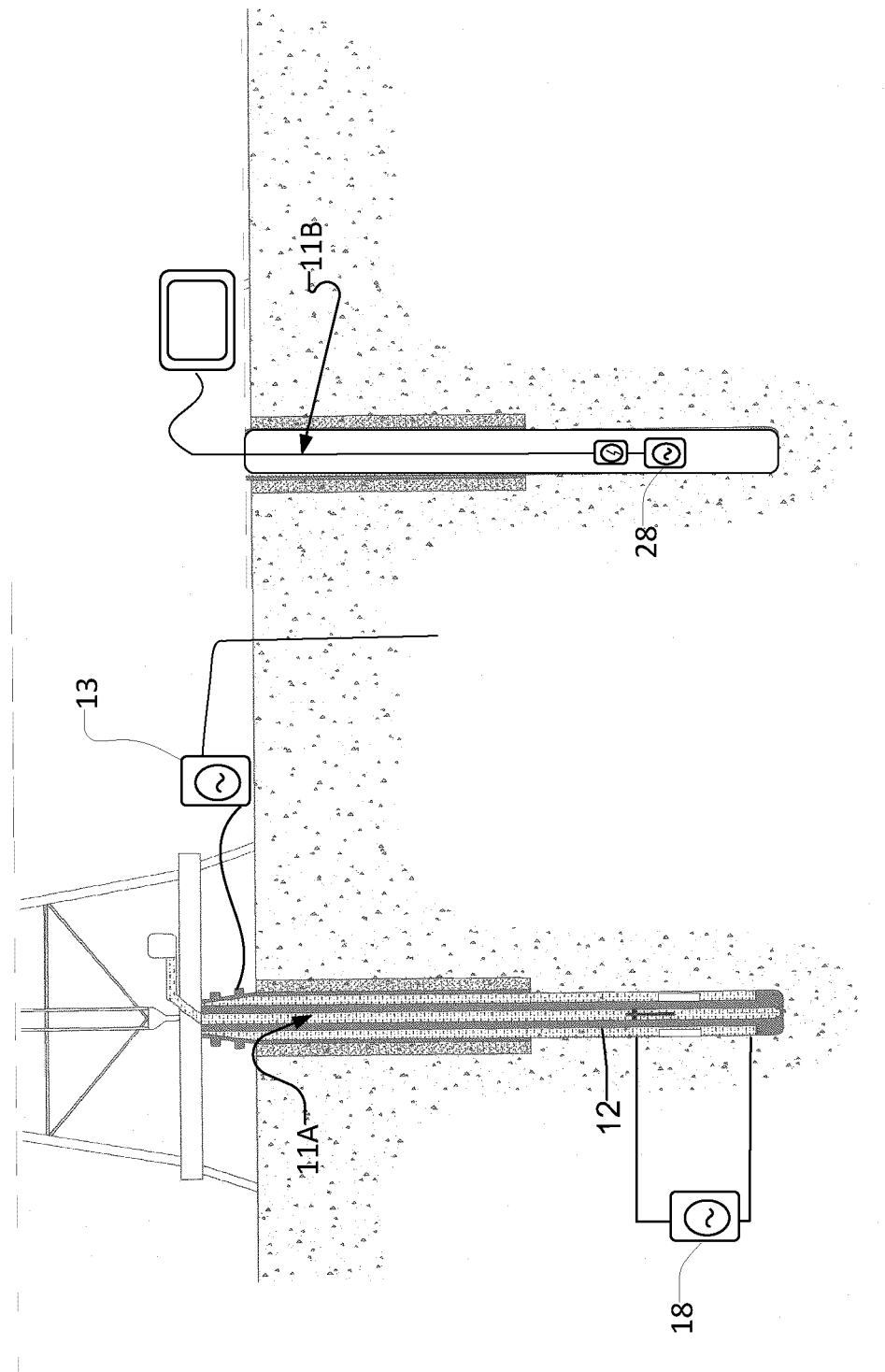
FIG. 2 shows an example downhole tool comprising an EM telemetry signal generator in one borehole communicating with an active EM telemetry receiver in a second borehole.

Embodiments of the present invention provide active receivers for EM telemetry transmissions that are located in a bore hole adjacent to a borehole in which the EM telemetry transmitter is located. FIG. 2 shows an example embodiment in which a downhole tool 13 comprising an EM telemetry signal generator 18 is provided in a drill string 12 in a borehole 11A. An EM telemetry receiver 28 is provided in a second borehole 11B. Borehole 11B may be termed a "communication borehole" since it is used for communication (borehole 11B may optionally have other applications as well as communication).

Boreholes 11A and 11B are adjacent to one another. In some embodiments boreholes 11A and 11B are within 10 meters of one another. In some embodiments boreholes 11A and 11B are within 100 meters of one another. In some embodiments boreholes 11A and 11B are within 10 kilometers of one another.

EM telemetry receiver 28 is provided with a reliable data connection to the surface. In some embodiments EM telemetry receiver 28 has a wired connection to the surface. For example, EM telemetry receiver 28 may be suspended on a wireline that includes a number of signal conductors and also preferably includes power conductors which supply electrical power to EM telemetry receiver 28. The signal conductors may comprise, for example, electrical conductors and/or optical fibers. The power conductors, where provided may be separate or perform the dual functions of supplying electrical power to EM telemetry receiver 28 and carrying signals to and/or from EM telemetry receiver 28.

As another example, EM telemetry receiver 28 may be connected to surface equipment by way of wired drill pipe, a high speed downhole data communication system (e.g. VAST™ or XACT™), an acoustic telemetry system or the like. Such systems may be too expensive to justify deploying in every borehole but it may be cost effective to deploy such a system in borehole 11B and to use that system to receive communications from and/or to deliver data to downhole tools in one or more adjacent boreholes. Such a system may be used while borehole 11B is being drilled. In some embodiments the system may be used while both of boreholes 11A and 11B are being drilled. After borehole 11B has been drilled the system may be left installed in borehole 11B and may be used for receiving and/or sending telemetry signals from or to data telemetry systems in other nearby boreholes.

Where data communication between surface equipment and EM telemetry receiver 28 is provided by a system supported by a drill string, EM telemetry receiver 28 is optionally removably attached to the drill string. Coupling between EM telemetry receiver 28 and the communication system may be provided by a wet connect comprising mating connectors on the drill string and the EM telemetry receiver 28. This construction can allow the EM telemetry receiver to be retrieved from wellbore 11B independently of the drill string.

The choice of data communication technology for carrying data to and from an EM telemetry receiver 28 in borehole 11B can depend on whether or not borehole 11B has been previously drilled or is currently being drilled. In the case where borehole 11B is currently being drilled, telemetry receiver 28 optionally incorporates or is connected to receive data from measurement while drilling (MWD) sensors and/or well logging sensors and to relay that data to surface equipment. Such data can be of assistance to those who are operating equipment to drill borehole 11B. In other embodiments a drill string used to drill borehole 11B may have tools for collecting MWD and/or logging data that are separate from EM telemetry receiver 28 but share in the data communication channel with the surface that is also used by EM telemetry receiver 28.

Figure 3:
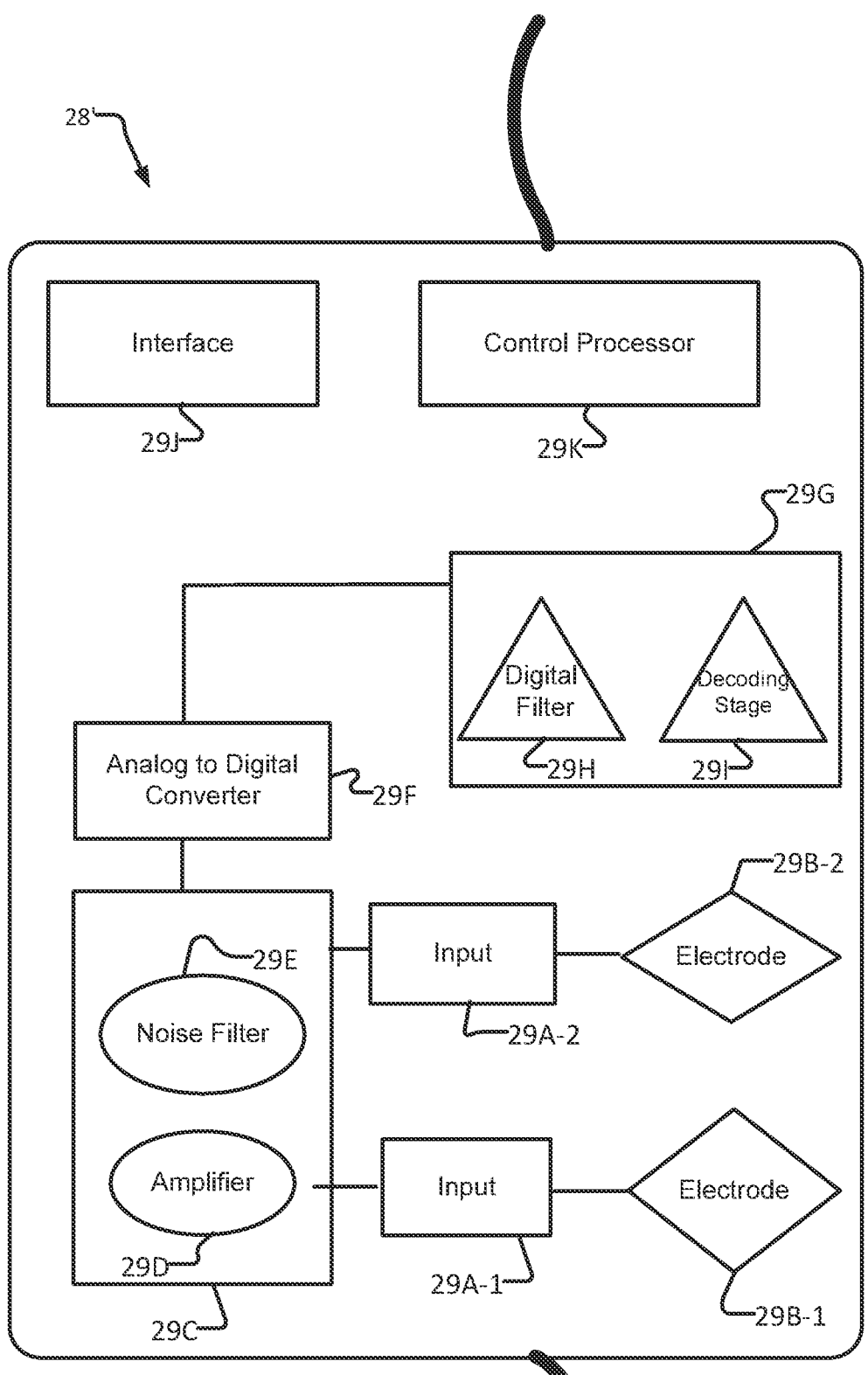
FIG. 3 shows an example EM telemetry receiver apparatus comprising a wireline and one or more EM telemetry receivers spaced apart along the wireline.

EM telemetry receiver 28 is an active receiver meaning that EM telemetry receiver 28 includes some downhole electronics for receiving and processing EM telemetry signals that originate from EM telemetry signal generator 18. For example, FIG. 3 shows an example EM telemetry receiver 28' comprising a pair of inputs 29A-1 and 29A-2 that are in electrical contact with corresponding electrodes 29B-1 and 29B-2.

Inputs 29A-1 and 29A-2 connect to an analog signal processing stage 29C which may include, for example, an amplifier 29D and electrical noise filters 29E. An output from signal processing stage 29C is digitized by an analog to digital converter (ADC) 29F. A digitized signal from ADC 29F is provided to a digital processing stage 29G. Digital processing stage 29G may include, for example, a digital filter 29H and a decoding stage 29I. Decoding stage 29I processes the received signals to obtain digital values encoded in the EM telemetry signal sent by EM telemetry signal generator 18. Decoding stage 29I may optionally check the accuracy of received signals by recognizing structures (e.g. frames) of data encoded in the transmitted signals and checking values such as checksums, parity bits or other data verification information encoded in the transmitted signals. In alternative embodiments the signal received is digitized and sent uphole for decoding/processing by surface equipment.

The example EM telemetry receiver 28' includes an interface 29J that transmits the decoded digital values to the surface, for example, by way of one or more signal conductors in a wireline to which EM telemetry receiver 28' is connected. A control processor 29K controls the overall operation of EM telemetry receiver 28'.

As discussed in more detail herein, an EM telemetry receiver may have multi-channel receiving capability such that it can receive communications from two or more downhole tools 13 (which may be located in the same adjacent borehole 11A or in different adjacent boreholes 11A). In such cases, EM telemetry receiver 28 may distinguish among the different signals it detects by frequency. Each downhole tool 13 may be assigned a different communication frequency. EM telemetry receiver 28 may apply active filtering (analog or digital or a combination of analog and digital filtering) to separate signals from different downhole tools 13.

In some embodiments, two or more receivers 28 are provided in borehole 11B. Each of receivers 28 may optionally be capable of receiving telemetry data in a plurality of channels. When a system as described herein is being used, one can select the frequency or frequencies that a particular downhole tool 13 will use to transmit data for reception in borehole 11B in order to optimize one or more of: SNR, data rate, power consumption at downhole tool 13 or the like. In cases where there are two or more receivers 28 in borehole 11B, one can also select one of the receivers 28 for receiving signals from a particular downhole tool 13 based on the same factors. Where there are multiple downhole tools 13, the optimization may be performed across all of the downhole tools 13. In such cases, channels and/or receivers may be assigned in a way which results in somewhat worse SNR or other metric for communications from one downhole tool 13 in order to obtain better performance for receiving communications from another downhole tool 13. In some embodiments, selection of a receiver 28 and/or frequencies is performed first for downhole tools 13 for which the reception is worst and remaining frequencies and/or receivers 28 are allocated as available for others of downhole tools 13 for which the reception is better.

In an example embodiment the system is configured to measure SNR of signals transmitted from a downhole tool 13 and received at a receiver 28 for each of a number of different frequencies. This may be done, for example, by causing each downhole tool 13 to transmit a test signal and receiving the test signals at a receiver 28. Where there are two or more receivers 28 the test signals from each downhole tool 13 may be received at each of the two or more receivers and SNR of each of the received signals may be determined. A particular channel for use by a particular downhole tool 13 may be selected by identifying the available channel that offers the best SNR (or other metric of signal quality).

In some embodiments, assigning transmit channels to downhole tools 13 may be repeated periodically. In such embodiments, a specific downhole tool 13 may initially be set to transmit at one frequency and may subsequently be set to transmit at a different available frequency that offers a better SNR (or other signal quality metric). In such systems, signals from a particular downhole tool 13 may initially be received at one receiver 28 in borehole 11B and may subsequently be received at a second receiver 28 in borehole 11B. The first and second receivers 28 may be spaced apart from one another along borehole 11B.

It is not mandatory that EM telemetry receiver 28 includes all of the components of the example EM telemetry receiver 28' illustrated in FIG. 3. For example, in some embodiments an EM telemetry receiver 28 is in high-speed digital communication with surface equipment. In some such embodiments the digitized signal output by ADC 29F may be transmitted to the surface equipment. Further processing and decoding may be performed at the surface equipment. Downhole EM telemetry receiver 28 performs sufficient processing of received signals to yield data that can be communicated to surface equipment with substantially no loss of fidelity. Processing such as: frequency filtering, decoding, measuring SNR or other signal quality metric(s), assigning channels to downhole tools 13, and/or assigning receivers 28 to downhole tools 13 may be performed at surface equipment.

EM telemetry receiver 28 may optionally be paired with or combined with an EM telemetry transmitter 29 to facilitate two-way data communication with downhole tool 13 using EM telemetry signals. In such embodiments, data for transmission to the downhole tool 13 may be delivered via a wireline to the EM telemetry transmitter 29 and transmitted from the downhole location of the EM telemetry transmitter 29 in borehole 11B to downhole tool 13 in borehole 11A.

Figure 4:
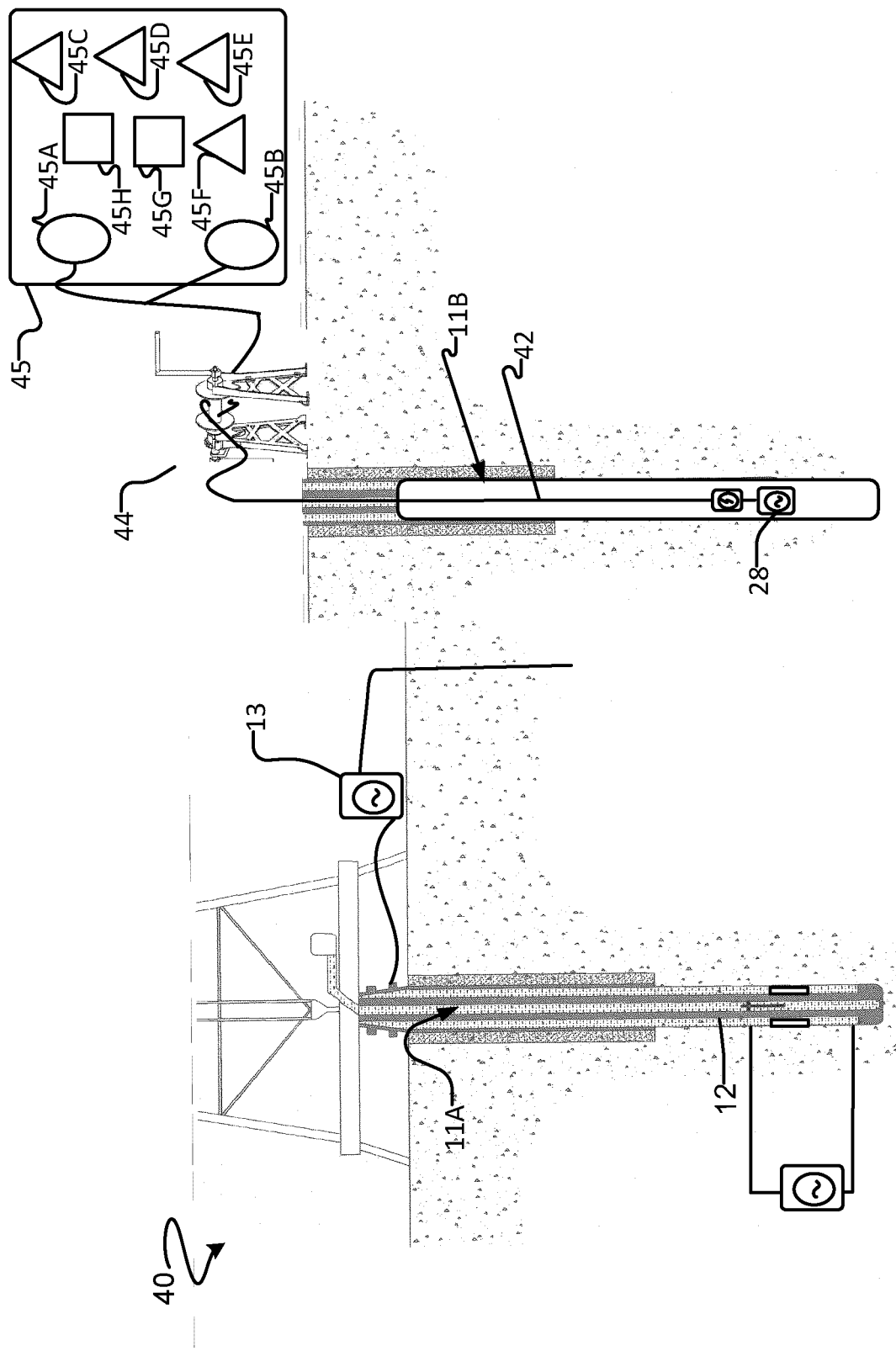
FIG. 4 is a block diagram showing functional components of an example EM telemetry system that may be deployed in one borehole to communicate with a downhole tool in another borehole.

FIG. 4 illustrates an example EM telemetry system 40 that may be deployed in one borehole 11B to communicate with a downhole tool 13 in another borehole 11A. EM telemetry system 40 includes a downhole receiver 28, which may be as described above, supported on a wireline 42. Wireline 42 is fed into borehole 11B from a winch 44. Wireline 42 is sufficiently long to lower EM telemetry receiver 28 to a desired depth in borehole 11B. The position of EM telemetry receiver 28 in borehole 11B may be adjusted up or down by operating winch 44.

Surface equipment 45 receives the data from downhole tool 13 and may perform any one or more of:
  decoding the data;
  storing the data;
  displaying the data;
  distributing the data to locations where it is needed;
  determining optimum channels and/or receivers and/or conductor elements for use in receiving signals from different downhole tools 13;
  controlling downhole tools 13 to transmit using assigned channels or frequencies; and
  further processing the data.

In the example embodiment of FIG. 4, surface equipment 45 includes an interface 45A connected to receive signals from wireline 42, a power supply 45B that provides electrical power for EM telemetry receiver 28 by way of wireline 42, a processor/controller 45C that is configured by software instructions in a program store 45D to appropriately handle the received data; a display 45E on which processor 45C may display data; a surface communication interface 45F by way of which received data may be sent to other devices such as a display remote from surface equipment 45, cloud storage, hand-held devices or the like; a data store 45G in which received data may be stored, a user interface 45H by way of which a user may interact with and control operation of surface equipment 45.

Surface communication interface 45F may comprise one or more wired or wireless interfaces which may include wireless interfaces such as WiFi, Bluetooth™ ZigBee™, Ubiquiti™, 3G, 4G, LTE or others and/or wired interfaces such as Ethernet or the like.

Apparatus 40 and downhole tool 13 may be adjusted in various ways to optimize communication between apparatus 40 and downhole tool 13. These include:
  adjusting the location of EM telemetry receiver 28 in borehole 11B;
  adjusting the locations of the electrodes used by a particular EM telemetry receiver 28 to pick up EM telemetry signals from downhole tool 13;
  selecting one from among a plurality of EM telemetry receivers 28 to receive signals from a downhole tool 13; and/or
  adjusting the nature of the EM telemetry signals transmitted from downhole tool 13.

In some embodiments some or all of these adjustments may be performed automatically. In typical applications, the location of downhole tool 13 in borehole 11A changes over time (e.g. as borehole 11A is drilled deeper). In such cases, the above adjustments may be performed periodically or continuously in order to maintain effective communication of data from tool 13 to surface equipment 45. Such continuous or periodic adjustments may be made automatically.

Adjusting the location of EM telemetry receiver 28 in borehole 11B may involve physically moving EM telemetry receiver 28 up or down in borehole 11B (e.g. using a winch to raise or lower a wireline supporting EM telemetry receiver 28 in borehole 11B) and/or selecting one of a plurality of EM telemetry receivers spaced apart from one another in borehole 11B to communicate with downhole tool 13.

Telemetry receiver 28 may optionally process received signals in various ways. For example, a telemetry receiver 28 may extract data from received signals and deliver the data to surface equipment 45 in digital form. In some embodiments telemetry receiver 28 extracts data and error detection and/or error correction codes from received telemetry signals and processes the extracted data with the error detection and/or error correction codes to detect and/or correct errors in the data. Where errors are detected a telemetry receiver 28 may optionally take steps to obtain data without errors, for example by controlling a downhole telemetry transmitter to transmit a signal requesting that the data be re-sent.

It is not necessary for borehole 11B to be sized for production of hydrocarbons or other production purposes. In some embodiments borehole 11B may be smaller in diameter than borehole 11A. This can advantageously make borehole 11B faster to drill and less expensive to drill than a larger-diameter borehole. Borehole 11B may be just large enough to accept receiver 28. Further, borehole 11B may be filled with a fluid that is chosen to have good properties for receipt of EM telemetry signals. For example, the fluid in borehole 11B may provide high electrical resistivity. For example, borehole 11B may be filled with a suitable oil-based drilling fluid. Making borehole 11B relatively small in diameter also advantageously reduces the amount of fluid that is required to fill borehole 11B when that is desired.

In some applications, one or more EM telemetry receivers 28 in a single borehole 11B may receive data communications from downhole tools 13 in a plurality of adjacent boreholes. In cases where borehole 11B includes plural spaced apart EM telemetry receivers 28, data from different downhole tools 13 may be relayed to the surface by way of different ones of EM telemetry receivers 28. An EM telemetry receiver 28 may relay data to surface from one or more downhole tools 13 in one or more adjacent wellbores.

The locations of electrodes used to pick up EM telemetry signals at an EM telemetry receiver 28 may be adjusted by providing multiple electrodes and selecting one or more pairs of the electrodes. EM telemetry transmissions may then be detected by monitoring voltage differential between the selected pair(s) of electrodes.

Figure 5:
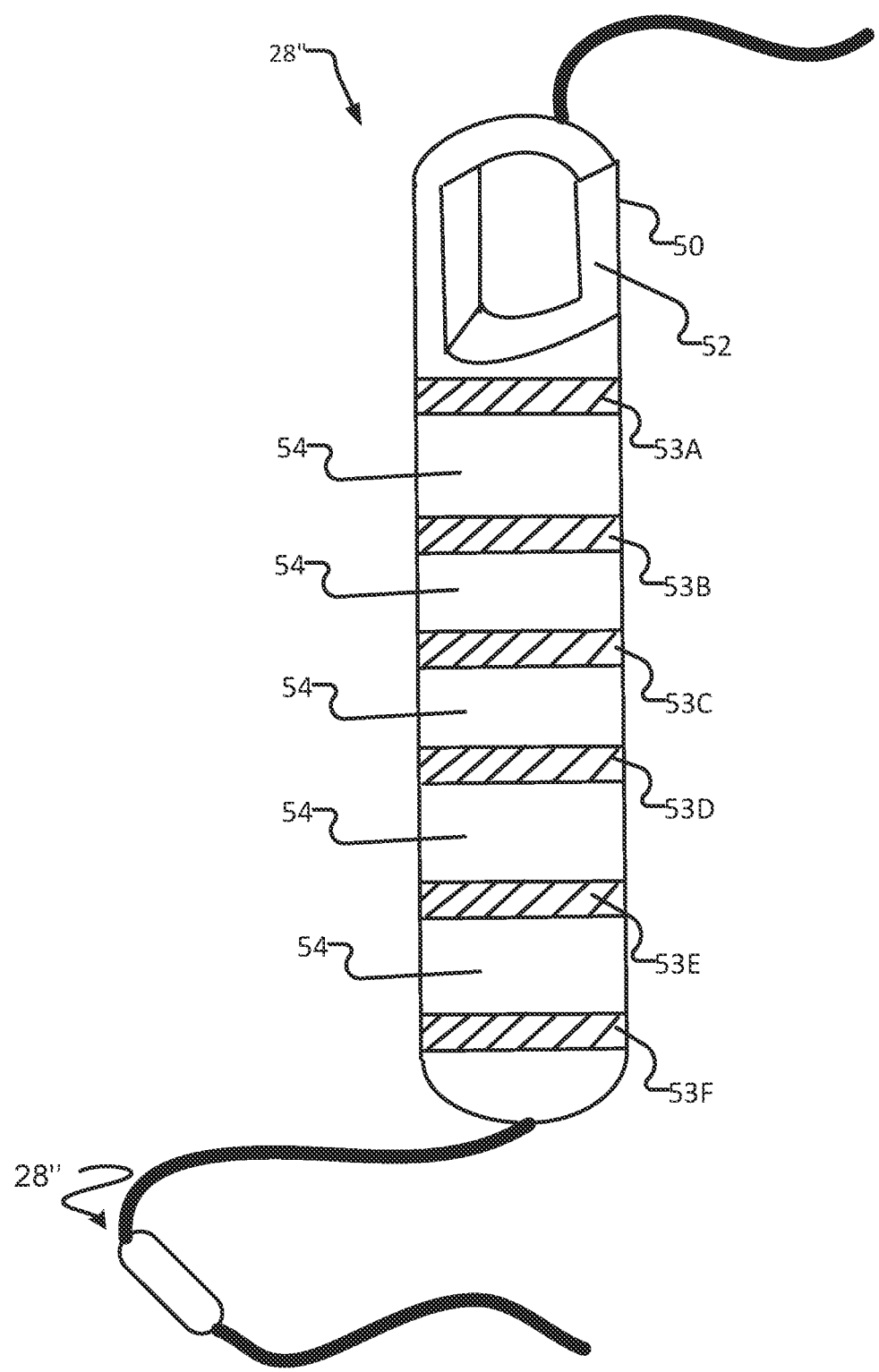
FIG. 5 is an elevation view showing a possible form factor for an EM telemetry receiver or transceiver.

FIG. 5 shows an example embodiment wherein an EM telemetry receiver 28" comprises an elongated probe 50. Probe 50 has a housing 52 that has electrically-conductive portions 53 spaced apart along it. The illustrated probe 50 has electrically-conductive sections 53A through 53F. More or fewer electrically-conductive sections 53 are provided in other embodiments.

Probe 50 includes a selection mechanism operable to select which pair(s) of electrically-conductive sections 53 are monitored to detect EM telemetry signals from a downhole tool 13. In some embodiments this mechanism permits EM telemetry signals from different downhole tools 13 to be detected using the same or different pairs of electrically-conductive sections 13.

The selection mechanism may take any of a wide range of different forms. These include:
  providing a network of electrically-controlled switches that can be configured to connect any pair of electrically-conductive regions 53 to inputs of a difference amplifier;
  providing a difference amplifier having one input connected to one of electrically-conductive regions 53 that serves as a reference electrode and a network of electrically-controlled switches that can be configured to connect any other one of electrically-conductive regions 53 to another input of the difference amplifier;
  providing plural difference amplifiers each connected to monitor potential differences between a pair of electrically-conductive regions 53 and a network of electrically-controlled switches that can be configured to connect the output of a selected one of the amplifiers for conversion to the digital domain by one or more ADCs;
  providing plural difference amplifiers each connected to monitor potential differences between a pair of electrically-conductive regions 53, digitizing outputs from the difference amplifiers and selecting in software which digitized output(s) to process for the purpose of decoding EM telemetry signals from a downhole tool 13; and/or
  using one or more ADCs together with suitable amplification and/or signal conditioning digitizing an electrical potential difference between a reference potential and each of the conductive regions and processing plural pairs of the digitized signals to compute associated signal quality metrics.

Processing the received signals and determining which pairs of electrically-conductive regions to use for receiving signals from a downhole tool 13 may be performed downhole (e.g. at probe 50 or at a receiver 28) or at surface equipment or using a combination of downhole and surface equipment.

In the embodiment illustrated in FIG. 5, electrically-conductive regions 53 are provided by parts of the wall of a pressure-tight housing of probe 50. Electrically-conductive regions 53 are separated from one another by electrically-insulating rings 54.

In some embodiments a plurality of downhole probes are spaced apart along borehole 11B. The downhole probes may, for example, be spaced apart along a wireline that provides signal conductors connecting each of the downhole probes to surface equipment. Each of the downhole probes may comprise a housing containing electronics connected to measure electrical potential differences between one or more pairs of plural electrodes associated with the downhole probe. In some embodiments some or all of the conductors comprise electrically-conductive portions of the housing of the probe. In some embodiments plural probes each contain electronics for a separate receiver 28.

In some embodiments two or more probes 50 may be provided. Probes 50 may be spaced apart and connected to one another such that the possible selection of pairs of conductive regions to monitor includes pairs made up of a selected conductive region 53 from one of the probes 50 and a selected conductive region from the other one of probes 50.

The telemetry signals transmitted from downhole tool 13 may be adjusted in one or more of the following respects (which may collectively be called EM transmit parameters or individually an EM transmit parameter):
  power level (voltage and/or current);
  transmit frequency;
  number of cycles per bit; and/or
  data encoding scheme.
Adjusting any of the EM transmit parameters involves providing commands or other feedback to downhole tool 13. These may be provided by way of an EM telemetry transmitter that is incorporated with EM telemetry receiver 28 or by another available communication channel.

The data encoding scheme may include a low-level protocol. The low-level protocol governs how individual bits of data are encoded. The low-level protocol may be pulse-based or carrier based. Embodiments of the invention may employ any suitable scheme for encoding data in an EM telemetry signal. Such schemes may include:
  QPSK (quadrature phase shift keying);
  BPSK (binary phase shift keying);
  FSK (frequency-shift keying);
  QAM (quadrature amplitude modulation);
  8ASK (8 amplitude shift keying);
  APSK (amplitude phase shift keying);
  etc.
Schemes which use any suitable combinations of changes in phase, amplitude, timing of pulses and/or frequency to communicate data may be applied.

A PSK (phase-shift keying) encoding scheme may use a number of cycles (at the current frequency) to transmit each symbol. The number of cycles used to transmit each symbol may be varied. For example, in low-noise environments one may be able to successfully transmit EM telemetry symbols using two cycles per symbol. In higher noise environments it may be desirable or necessary to use three cycles (or more) to transmit each symbol.

The data encoding scheme may also specify an error detection and/or correction protocol. For example, use of a parity bit or one or more CRC bits or the like.

At a higher level, the data encoding scheme may govern how specific data is to be arranged for transmission. At this level, the data encoding scheme may address issues such as the format of frames of data (both frame size and makeup) as well as what specific data is transmitted in each frame.

Optimization of the data communication from a downhole tool 13 to an EM telemetry receiver 28 may use one or more metrics. These can include one or more of:

signal-to-noise ratio (SNR);
signal strength at EM telemetry receiver 28;
achievable sustained data rate;
cost per bit of data transmitted (the cost may be in terms of power used to communicate the bit of data, a lower cost per bit may permit longer operation of downhole tool 13 on one set of batteries where downhole tool 13 is battery-powered);
a weighted combination of two or more of these (optionally including other factors);
etc.

The present technology has example applications in cases where a significant number of wellbores are drilled in close proximity, for example on a pad. In such cases, a pilot wellbore is often drilled first for the purpose of gaining information regarding downhole formations. In such cases, one or more EM telemetry receivers may be introduced into the pilot borehole and used to assist in drilling of other boreholes on the pad. Pilot boreholes are often plugged back and then sidetracked to provide a horizontal section after they have been drilled. Plugging the pilot borehole may be deferred until remaining boreholes on the pad have been drilled.

Figure 6:
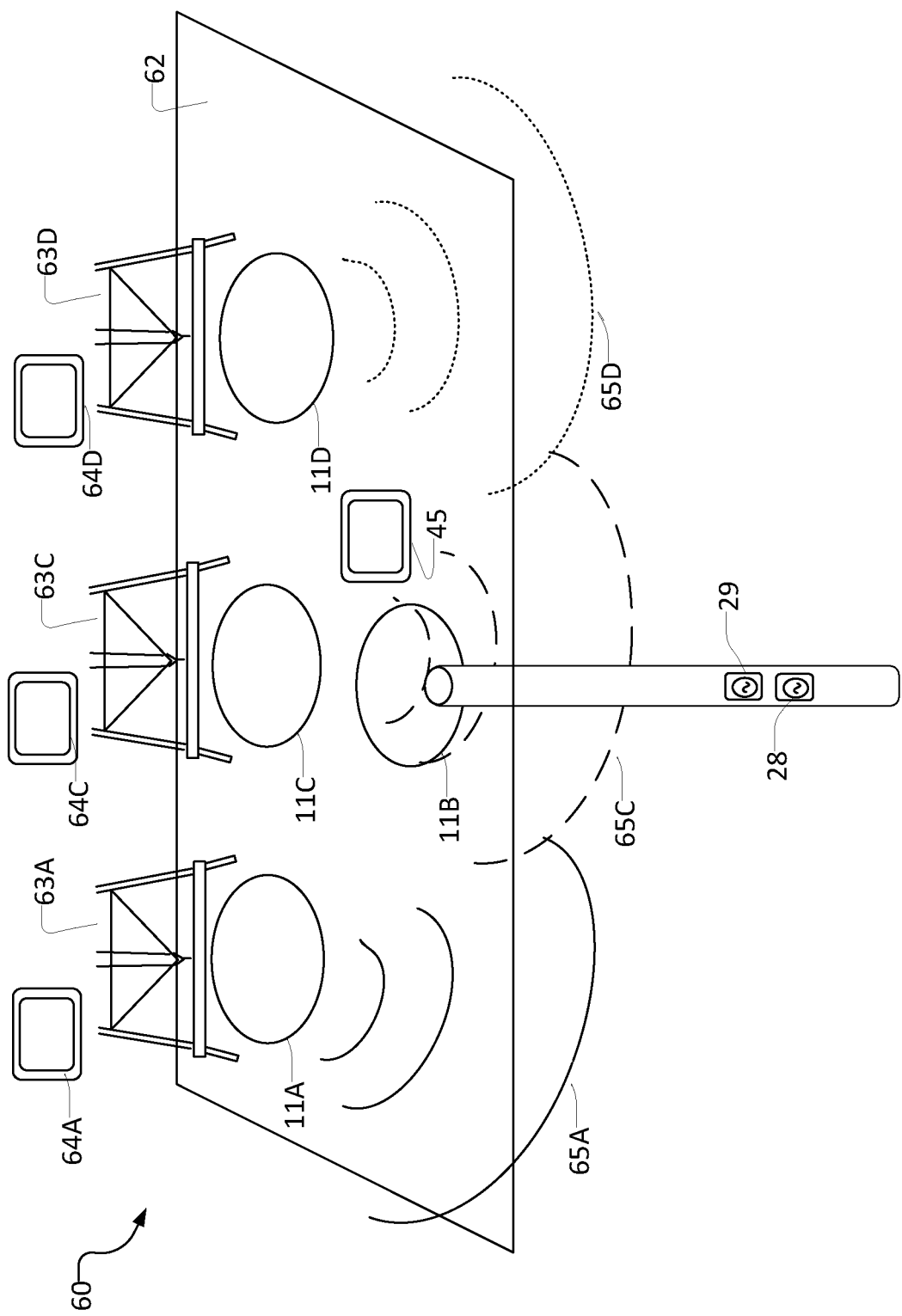
FIG. 6 is a schematic top view showing a drilling environment in which an array of boreholes is planned on a pad.

In some embodiments data transmitted by way of an EM telemetry receiver in borehole 11B is intended for application at one or more locations other than surface equipment 45. For example, FIG. 6 schematically illustrates a drilling environment 60 in which an array of boreholes 11 is planned on a pad 62. In this example, drill rigs 63A, 63C and 63D (collectively rigs 63) are drilling boreholes 11A, 11C and 11D respectively. Each rig 63 is associated with corresponding surface equipment 64 that may be used by personnel to view information pertinent to drilling of the corresponding borehole 11.

A borehole 11B includes an EM telemetry receiver 28 and surface equipment 45 connected to receive data from EM telemetry receiver 28. Borehole 11B may have been drilled previously (e.g. as a pilot borehole) or may be being drilled at the same time as boreholes 11A, 11C and 11D.

In some embodiments, the borehole being drilled employs a high data rate telemetry transmitter such as wired drill pipe, VAST, or XACT. This drilling system also employs a receiver device for receiving multiple nearby wellbores. In this way, a pilot hole is not needed and the high speed telemetry is used while actively drilling.

FIG. 6 illustrates schematically by lines 65A, 65C and 65D (collectively transmissions 65) the transmission of data as EM telemetry signals from EM telemetry transmitters in boreholes 11A, 11C and 11D to a corresponding EM telemetry receiver 28 in borehole 11B. Transmissions 65 are distinguishable from one another, for example by being transmitted at different frequencies and/or by including a transmission ID indicating the source of the signal.

Surface equipment 45 associated with borehole 11B is in data communication with surface equipment 64. This data communication may be provided in any suitable way, for example, by way of a wireless data communication technology such as WiFi or Ubiquiti™ or cellular data communication or the like or by way of a wired data communication network such as an Ethernet network.

Surface equipment 45 may include a switch that directs received data from borehole 11A to surface equipment 64A, data from borehole 11C to surface equipment 64C and so on. Any data from borehole 11B may be displayed at surface equipment 45. The association between specific ones of transmissions 65 and specific surface equipment 64 may be established during optimization of transmissions 65 as discussed in more detail elsewhere herein. In the case where plural tools 13 in different boreholes 11 communicate to EM telemetry receiver 28 optimization of transmissions 65 may result in an allocation of a specific transmit parameters such as a specific frequency or frequencies, specific data encoding method, specific data format, etc. to each tool 13.

Surface equipment 45 may maintain or have access to a table which associates the allocated frequency or frequencies and/or an ID encoded in a received signal to the corresponding one of surface equipment 64. As data is received at surface equipment 45, surface equipment 45 determines the frequency used to transmit that data and/or decodes an ID encoded in the transmitted data and uses the table to direct the data to the correct surface equipment 45. In another example, embodiment surface equipment 45 broadcasts the received data to multiple sets of surface equipment 64 together with information such as received frequency and/or ID that can be used by the corresponding surface equipment 64 to identify data relevant to it.

Reverse communication from a surface equipment 64 to a downhole tool 13 in a corresponding borehole 11 may be handled in a similar way. In some embodiments different frequencies are assigned to EM telemetry transmissions from a transmitter in wellbore 11B to a tool 13 in a different wellbore 11 and to EM telemetry transmissions from the tool 13 to an EM telemetry receiver 28 in wellbore 11B.

In some embodiments selection of a frequency and/or a transmitter and/or a pair of electrical contacts to be used for transmitting EM telemetry signals from bore hole 11B to a particular downhole tool in a borehole 11A may be based on the same information described above for selecting the configuration of the system for receiving transmissions from the downhole tool 13. In other embodiments, downhole tools 13 are configured to monitor the quality of received EM telemetry signals and reverse "downlink" communication can be used to reconfigure transmitters for optimum reception, data rate or data sets.

Some advantages and opportunities exist because the present technology both transmits and receives EM telemetry signals at underground locations. One advantage over conventional EM telemetry is that the signals are subject to lower electromagnetic interference from surface equipment than would be the case where EM telemetry signals are detected at a receiver located at the surface.

Another advantage is that overall attenuation of an EM telemetry signal may be less for a transmission 65 than for a transmission from a downhole tool 13 to the surface. This may be the case, for example, because a downhole location of EM telemetry receiver 28 may be closer to a downhole tool 13 than the surface and/or the underground formations may carry EM telemetry transmissions in horizontal directions more readily than in vertical directions that cross conductive formations.

Another advantage is that the depth of EM telemetry receiver 28 in borehole 11B may be varied for optimum reception, which is a freedom not available for a surface-located EM telemetry receiver.

Because the underground environment may have lower electromagnetic interference and/or lower attenuation than surface equipment, downhole tools 13 may transmit EM telemetry signals at power levels lower than would be needed for communication directly to surface equipment and/or may transmit at higher data rates than would be useable for communication directly to surface equipment. In some cases, downhole tools 13 may transmit EM telemetry signals at significantly higher data frequencies than the frequencies that are receivable at surface equipment (which usually do not exceed 20 Hz and are often in the range of ½ Hz to 12 Hz). For example, in some embodiments downhole tools 13 transmit EM telemetry signals at frequencies of 30 Hz or more. In some cases, transmissions 65 may be detected at EM telemetry receiver 28 when they have frequencies of hundreds of Hz into the hundreds of kHz range. In some embodiments higher frequencies are allocated to downhole tools 13 closer to EM telemetry receiver 28 and lower frequencies are allocated to downhole tools 13 farther away from EM telemetry receiver 28. The availability of higher frequencies for EM telemetry transmissions allows a larger number of non-interfering transmission frequency bands to be assigned for communications to and from different downhole tools 13 than would be the case if only frequencies below 20 Hz were useable.

Since an EM telemetry transmitter 29 in borehole 11B may be powered from the surface (e.g. by way of a wireline), it can be convenient to use transmissions from EM telemetry transmitter 29 received at tools 13 to optimize electromagnetic communications from tools 13 to EM telemetry receiver 28. A surface-powered transmitter can be operated at relatively high power levels without exhausting a battery power supply. In some embodiments EM telemetry transmitter 29 is operated to transmit signals at each of a number of different frequencies at each of a number of locations in borehole 11B. One or more downhole tools 13 that detect the signals from EM telemetry transmitter 29 may signal that the signals have been detected and may provide data regarding the detected signals such as signal strength, noise, etc. This data may then be processed to select appropriate parameters for transmissions 65 originating from the downhole tool 13.

Various mechanisms may be used by a downhole tool 13 to confirm receipt of a signal from EM telemetry transmitter 29. For example a downhole tool 13 may comprise a mud pulse telemetry system that may be operated to transmit data characterizing received signals to surface equipment or downhole tool 13 may transmit the data characterizing the received signal by EM telemetry to be received at surface equipment or at EM telemetry receiver 28. Downhole tool 13 may transmit the data using conservative EM telemetry parameters (e.g. relatively high power and low frequency) to make it more likely that the data will be received.

Figure 7:
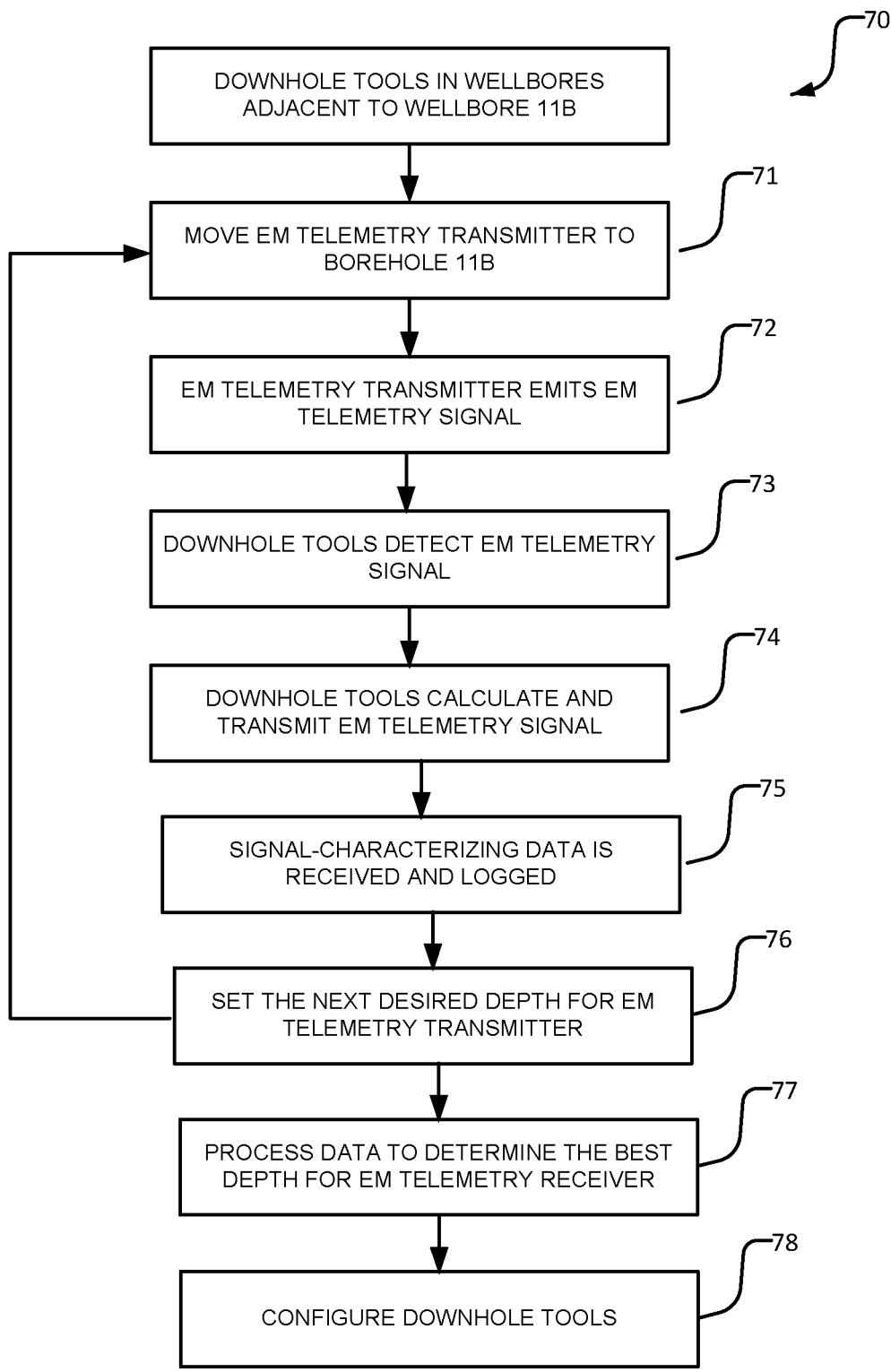
FIG. 7 is a flow chart illustrating an example method for optimizing telemetry communication to or from one or more downhole tools.

An example optimization method 70 is illustrated in FIG. 7. Method 70 begins with one or more downhole tools 13 located in wellbores 11 adjacent to wellbore 11B. In block 71, EM telemetry transmitter 29 (which may be co-located with and/or integrated with EM telemetry receiver 28) is moved to a desired depth in borehole 11B.

In block 72, with EM telemetry transmitter 29 at the desired depth, EM telemetry transmitter 29 is operated to emit an EM telemetry signal. The signal need not convey any particular data. The signal may be delivered at one or more frequencies simultaneously.

In block 73, the signal is detected at a downhole tool 13. In block 74, the downhole tool 13 calculates and transmits characteristics of the received signal. The characteristics may include signal strength and noise level (or signal to noise ratio). If the signal includes multiple frequency components the downhole tool may determine the characteristics for each frequency component. Downhole tool 13 may include an EM telemetry signal receiver that is similar to or the same as EM telemetry receiver 28. In block 75, the signal-characterizing data is received and logged.

In other embodiments the signals are transmitted in the opposite direction (i.e. from downhole tool 13 to receiver 28) and the described processing is performed at receiver 28 and/or at surface equipment 45.

In cases where there are plural downhole tools 13 blocks 72 to 74 may be performed for each downhole tool 13 that detects the signal. Downhole tools 13 that do not detect the signal may do nothing.

Block 75 decides whether all desired locations for EM telemetry transmitter 29 in borehole 11B have been tested. If so, method 70 proceeds to block 77. Otherwise (i.e., a NO result at block 75), block 76 sets the next desired depth and method 70 loops back to block 72.

At block 77, the data received from downhole tool(s) 13 is processed to determine the best depth for EM telemetry receiver 28 (corresponding to the best reception, on average, by downhole tool(s) 13 of the signals from EM telemetry transmitter 29) and to determine EM telemetry parameters to be used by each of downhole tool(s) 13 to generate telemetry transmission(s) 65. This processing may attempt to find parameters that achieve any of a range of different goals such as: adequate reception with minimum power use (or minimum cost per bit); most reliable reception; fastest reliable data rate; lowest SNR; a desired balance of these or the like.

At block 78, the downhole tool(s) 13 are configured to use the telemetry parameters established in block 77. Once telemetry communications have been established between downhole tool(s) 13 and EM telemetry receiver 28, a tuning process may be performed to maintain the quality of transmissions 65. In some embodiments the tuning process comprises moving EM telemetry receiver 28 uphole or downhole in borehole 11B and monitoring how the characteristics of received telemetry transmissions 65 change as a result. This process may be performed automatically to maintain optimum reception of transmissions 65.

In some cases a downhole tool 13 is in a borehole that is being drilled such that the downhole tool 13 moves deeper into the earth as the borehole is extended. In some embodiments an EM telemetry receiver 28 in another borehole 11B may be automatically advanced downhole at the same or a similar rate as downhole tool 13 moves deeper in its borehole 11A. This position adjustment may be performed manually or automatically. This position adjustment may be made continuously or in periodic steps. The position adjustment to keep telemetry receiver at a similar depth as a downhole tool 13 may be combined with position optimization for example as described above in relation to FIG. 7. This position adjustment may be performed by moving one EM telemetry receiver 28 or may be performed in whole or by part by selecting among plural EM telemetry receivers 28 that are at different depths.

In some embodiments a plurality of EM telemetry receivers 28 are spaced apart from one another (e.g. by 100 to 1000 feet—about 30 to 300 m). For example, the EM telemetry receivers 28 could be spaced-apart along a wireline. In such embodiments method 70 may involve selecting different ones of EM telemetry receivers 28 to receive signals from different ones of downhole tools 13. This choice may be based on best SNR or greatest signal strength for example.

If transmissions 65 from a particular downhole tool 13 starts becoming unreliable (e.g. the SNR decreases to a level that is lower than desired or the received signal strength falls below some threshold), then the downhole tool may be reconfigured to change parameters of the transmissions 65, for example, by increasing power, decreasing frequency, shifting to use more cycles per bit transmitted, or the like. In addition or in the alternative, EM telemetry receiver 28 may switch to a different combination of electrodes that offers better reception for the transmissions 65.

If the SNR for transmissions from a particular downhole tool 13 is above a threshold, then the downhole tool 13 is optionally configured to transmit EM telemetry signals in a way that increases data rate (e.g. by switching to a higher frequency of data transmission and/or reducing cycles/bit) and/or decreases power consumption (e.g. by reducing current and/or voltage of the transmitted signals and/or by shifting to an encoding method that transmits more bits at a reduced power per bit).

Since EM telemetry receiver 28 may service a large number of tools 13 it remains cost effective to provide high performance hardware as part of EM telemetry receiver 28. For example, EM telemetry receiver 28 may comprise high performance low-noise amplifiers, high resolution (e.g. 32-bit) ADCs and significant data processing power to perform high performance digital filtering, signal decoding and SNR measurements downhole. An EM telemetry receiver 28 may optionally comprise a memory for logging data from borehole 11B and/or from one or more boreholes 11A. Further, EM telemetry receiver 28 may comprise a control system that adapts its operation for best telemetry communications from and/or to downhole tools 13. For example, the control system may monitor each transmission 65 using different pairs of spaced-apart electrodes and use the best pair of electrodes to process the signal. In some embodiments the control system directly or indirectly controls a winch that sets the depth of downhole receiver 28 in borehole 11B. The winch may be controlled automatically to raise and/or lower downhole receiver 28 in order to allow the control system to identify an optimum depth for receiving transmissions 65.

In some embodiments, data from logging of borehole 11B is used to predict good and bad depths for EM telemetry receiver 28. The logging may, for example comprise electrical resistivity measurements. Such measurements, taken together with known depth of downhole tool(s) 13 may be used to predict depths of poor reception of transmissions 65 (e.g. depths at which formations have high electrical conductivity or depths at which high conductivity formations significantly block paths between downhole tool 13 and EM telemetry receiver 28).

Figure 8:
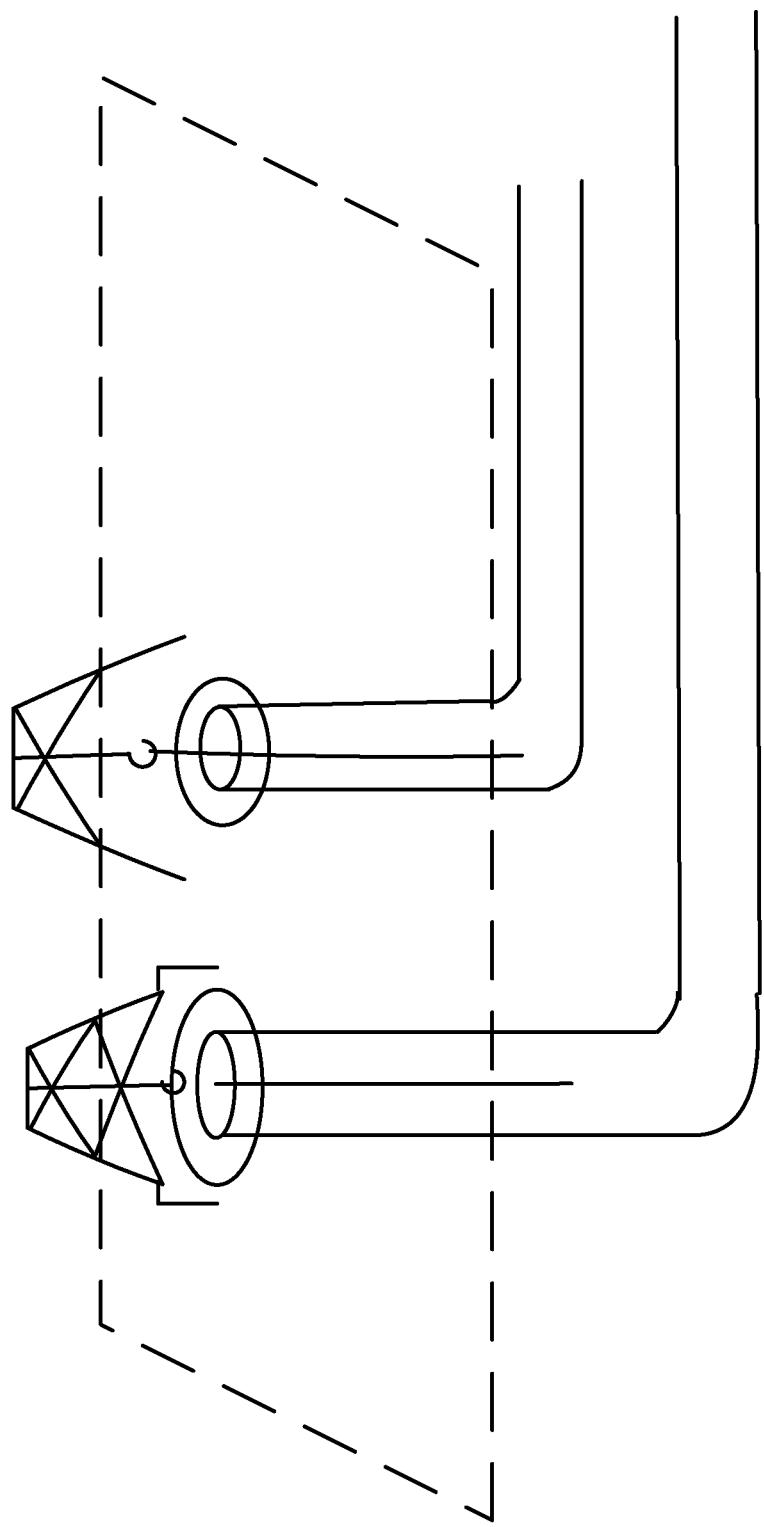
FIG. 8 is a schematic illustration showing a set of related boreholes.

EM signals exchanged between downhole tools 13 in one or more boreholes 11A and one or more transmitters 29 and/or receivers 28 in borehole 11B may optionally be processed to derive information about the relative positions and trajectories of boreholes 11. This information may be applied to drill a plurality of boreholes having a specified geometric relationship to one another and/or to verify the geometric relationship of a set of boreholes. For example, it may be desired to drill an array of boreholes that are all parallel to one another. FIG. 8 shows an example of a set of boreholes arranged for Steam Assisted Gravity Drainage (SAGD) drilling. SAGD is just one example application. This aspect of the invention is not limited to drilling boreholes for SAGD.

Figure 9:
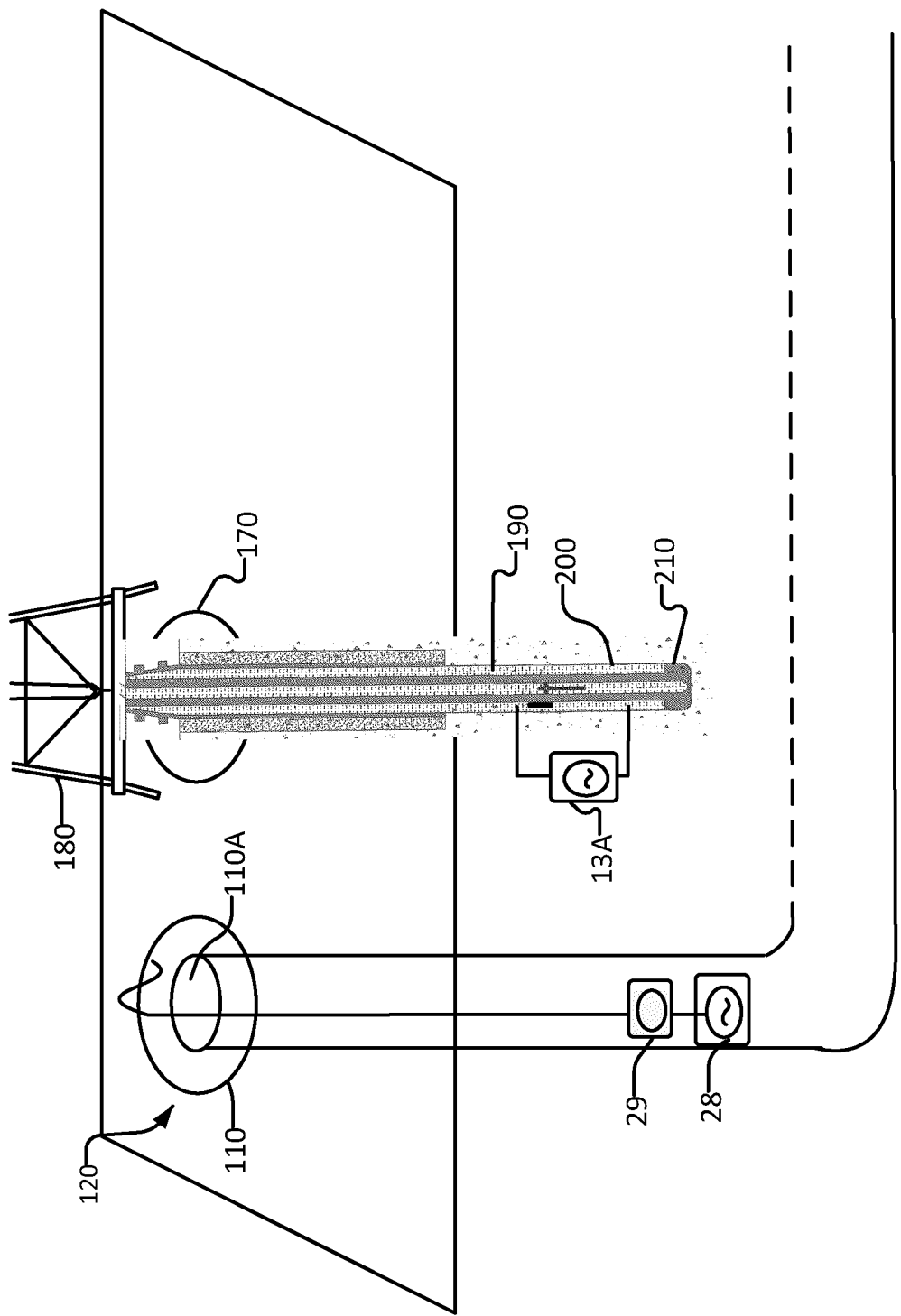
FIG. 9 schematically shows a portion of an array of wellbores for use in Steam Assisted Gravity Drainage (SAGD).

FIG. 9 schematically shows a portion of an array of wellbores for use in SAGD and illustrates why it is desirable to control the positions of the wellbores. Where two wellbores come too close together, a "steam short circuit" may result (where steam effectively breaches across the zone, represented by the dashed line, into the second wellbore, leaving the remaining "producing zone" un-energized by steam and thus not producing). FIG. 9 also shows cold zones where the primary and secondary wells are outside the "production zone", such that steam is not able to heat the zone of interest to encourage production and is thus ineffective. Problems of these types may be reduced by precision drilling of SAGD wellbore arrays.

In FIG. 9, a primary wellbore 110 with a horizontal section 110A is drilled through a formation of interest 120. Drilling can be done, for example, by means of directional drilling techniques known to those skilled in the art. FIG. 9 also shows an example secondary wellbore 170 being drilled using a drill rig 180 which drives a drill string 190. Any suitable directional drilling methods may be applied to guide the drilling of secondary wellbore 170 (including directional drilling methods known to those skilled in the art). A bottom hole assembly (BHA) 200 is attached to the bottom of drill string 190 and has a drill bit 210 attached to a bottom end thereof. BHA 200 may comprise multiple sections of drill string 190 and may incorporate a measurement while drilling (MWD) system. A downhole tool 13A is included in the BHA. The location of secondary wellbore 170 relative to primary wellbore 110 may be determined by finding distances between downhole tool 13A and: one or more other downhole tools 13; a receiver 28 in primary wellbore 110 and/or a transmitter 29 in primary wellbore 110.

Using EM signals to determine distances between different downhole devices may be done in various ways including any one or more of:

- making time of flight measurements for EM signals transmitted in either direction between one or more downhole tools 13 and one or more signal receivers 28;
- monitoring the attenuation of received EM signals that have been transmitted in either direction between a downhole tool 13 and a signal receiver 28;
- monitoring how the phases of received signals vary with frequency as described for example in U.S. Pat. No. 6,859,761;
- adapting the techniques described in Savvides, Andreas; Han, Chih-Chieh; Srivastava, Mani B. "Dynamic Fine-Grained Localization in Ad-Hoc Wireless Sensor Networks", Center for Embedded Network Sensing, 2001 to EM telemetry signal frequencies.

Such measurements may be taken between plural pairs of a downhole tool 13 and a signal receiver 28. The distances measured between plural signal sources and signal receivers may be used together with known locations of some of the signal sources and/or signal receivers to triangulate positions of other ones of the signal sources and/or signal receivers. Since the signal sources and signal receivers are located in wellbores, determining the positions of signal sources and/or signal receivers in one wellbore provides information regarding the trajectory of the wellbore. This information may be made available in real time or near real time in some embodiments.

Such measurements taken in combination with models that relate time of flight and/or attenuation to distance may be used for example to triangulate to determine distances and/or directions to downhole tools 13 from different transmitters 29 and/or receivers 28 in borehole 11B. The models may optionally be based in part on measurements of properties such as resistivity, reactance or the like determined by logging while drilling one or more of boreholes 11A and 11B.

The presence of boreholes 11A and 11B which respectively contain a downhole tool 13 and an EM telemetry receiver 28 and/or an EM telemetry transmitter 29 also permits resistivity measurements to be made based in transmission of EM telemetry signals from one of boreholes 11A and 11B to the other one of boreholes 11A and 11B. In some cases such resistivity measurements may be performed by transmitting an EM signal from a transmitter in one borehole and measuring the characteristics of the signal when received at a receiver in another borehole. The EM signal used for resistivity measurements may optionally have a frequency significantly higher than frequencies used by transmission of data by EM telemetry. The EM signal used for resistivity measurements may optionally be a pulsed signal.

The resistivity of the intervening formations may be determined based on the distance between the transmitter and receiver (which may be determined using ranging methods as described herein and/or may be determined based on known locations of the transmitter and receiver as well as signal characteristics such as a degree of attenuation of the transmitted signal, the signal frequency, a phase shift between the transmitted and received signal a time of flight of the signal and/or a decay of the signal after a pulse in the case of a pulsed signal.

Resistivity measurements between boreholes may be performed between two downhole tools 13 in different boreholes as well as between a downhole tool 13 in one borehole and a receiver 28 or transmitter 29 in another borehole.

Some embodiments provide a resistivity testing mode in which such signals are exchanged in one or both directions between two boreholes and one or more characteristics of the transmitted signals are measured or known and one or more characteristics of the received signals are measured. Processing the results of such measurements to evaluate resistivity or other formation characteristics may be done at a processor downhole and/or by surface equipment.

The speed of propagation of EM signals in geological formations and the attenuation of EM signals in geological formations can both depend on the local characteristics of the formations through which the EM signals are propagating. This could lead to errors, especially in time of flight related measurements. Fortunately, in many practical applications, characteristics of the geological formations in which multiple neighboring boreholes are desired are often fairly consistent across the neighboring boreholes. In many cases each of the boreholes will penetrate the same formations at the same or similar depths and the characteristics of each formation may be similar at each borehole and between the boreholes. In some embodiments distance measurements between boreholes are made when a downhole tool 13 and receiver 28 are located in the same geological formation or in geological formations having substantially similar characteristics. In such cases, time of flight and/or attenuation related measurements may be more accurate than they would be in the case of signal propagation through formations having markedly different EM signal transmission properties.

EM signals exchanged with any number of downhole tools 13 may travel through the different formations between apparatus (e.g. a receiver or transmitter) in borehole 11B and a transmitter or receiver at a downhole tool 13 in another borehole 11. Errors in time of flight and/or attenuation related measurements resulting from changes in the speed of travel and/or attenuation of EM signals traveling through various formations of different and inconsistent properties may be accounted for by using known properties of the formations and formation profiles obtained from surveys such as resistivity logs, gamma logs, etc. Computations to correct for perturbations in the received signal may be made based on depth, geometry, signal characteristics (e.g. frequency) and/or nature of formations. Proper corrective algorithms may be applied.

In some embodiments distance measurements are made by setting one or more tools 13 to operate in an 'echo' mode in which a trigger signal transmitted by a transmitter in borehole 11B is transmitted and received at the downhole tool 13. The reception of the trigger signal triggers the downhole tool 13 to transmit an 'echo' signal that is received at a receiver 28 in borehole 11B. The echo signal may be transmitted with a known power level such that its attenuation may be determined by downhole equipment in borehole 11B or surface equipment. The echo signal may be transmitted at a precisely known time after detection of the trigger signal by downhole tool 13 to facilitate round trip time of flight measurements. In some embodiments the downhole tool 13 locks to the phase of the trigger signal and the echo signal transmission is initiated at a set time relative to a set phase of the trigger signal.

In some embodiments downhole tools 13 and/or signal receivers 28 and/or signal transmitters 29 comprise or have access to clock signals from synchronized clocks. The clocks may, for example, comprise crystal oscillators. In an example embodiment, the clocks comprise crystal oscillators operating in the range of 20 to 500 MHz (e.g. some embodiments might use clocks operating at about 32 MHz). In general, a higher frequency clock can provide better temporal resolution in measuring time of flight of EM telemetry signals. The clocks may be used to measure time of flight by recording a time when a signal is transmitted (e.g. by a downhole tool 13 or a signal transmitter 29) and a time when the signal is received (e.g. at a downhole tool 13 or a signal receiver 28).

In some embodiments different time of flight measurements are made for EM telemetry signals of different frequencies or frequency contents. Such measurements may permit more accurate estimation of distances between different signal transmitters and signal receivers and/or information regarding properties of the formation(s) between pairs of signal transmitters and signal receivers.

In an example embodiment, a transmitted signal comprises a synchronization header, a physical header and data. The synchronization header may comprise, for example a predetermined preamble followed by a "START_FRAME" delimiter. The physical header may comprise a sequence of bits that specifies the size of the data frame (unless a fixed frame size is assumed).

A clock at a signal receiver may record a time at which a START_FRAME delimiter is detected. The signal receiver may also trigger a free-running timer to measure a duration of the signal. The signal transmitter may transmit data to the signal receiver indicating the duration of the signal as measured at the signal transmitter as well as the time at which the transmission commenced according to the clock of the signal transmitter. This data allows clocks of the signal transmitter and signal receiver to be compared and also allows determination of time of flight of the signal. A distance between the signal transmitter and signal receiver may be estimated from the time of flight.

In some embodiments distance measurements are made between different downhole tools 13 in different boreholes 11 in the same manner described above. One downhole tool 13 may receive EM signals originating from another downhole tool 13. The received signals may be processed together with information regarding the transmitted signals to determine a distance between the downhole tools 13. For example, distance may be estimated from time-of-flight and/or attenuation of the transmitted signals. In this way it is possible to establish by triangulation the three-dimensional configuration of receivers 28, transmitters 29 and downhole tools 13.

In some embodiments distance measurements are made between different downhole tools 13 in the same borehole in the same manner described above. One downhole tool 13 may receive EM signals originating from another downhole tool 13. The received signals may be processed together with information regarding the transmitted signals to determine a distance between the downhole tools 13. For example, distance may be estimated from time-of-flight and/or attenuation of the transmitted signals. Such distance information can help to understand the trajectory of a curving borehole.

In some embodiments where distance measurements are made between different downhole tools 13 in the same borehole the downhole tools 13 may be spaced apart from one another by known distances along the borehole. These known distances coupled with measurements of the distances between downhole tools 13 (made for example by any of the techniques described herein and/or other techniques such as measuring time of flight and/or attenuation of acoustic signals transmitted from one downhole tool 13 and received at one or more other ones of the downhole tools 13) can improve the accuracy of triangulation and provide a more accurate understanding of the geometry of the borehole. Such measurements can be additionally combined with triangulation from points outside of the borehole (e.g. signal transmitters and/or signal receivers in other nearby boreholes and/or at the surface) to provide still more accurate estimates of the true location and trajectory of the borehole.

In some embodiments distance measurements are made between one or more EM signal transmitters or receivers and a plurality of different downhole tools 13 in the same borehole 11.

In some embodiments alternative ranging technologies are applied to calibrate and/or confirm distance measurements based on propagation of EM signals. For example, a magnetic ranging technology and/or acoustic ranging according to any of the embodiments described in WO 2014/183187 which is hereby incorporated herein by reference for all purposes may be performed in combination with EM time of flight and/or attenuation measurements.

In an example embodiment one or more acoustic sensors (e.g. fiber BRAGG sensors, microphones, or the like) are provided in borehole 11B. Such acoustic sensors may, for example, be integrated with receivers 28. These acoustic sensors may be operated to detect acoustic emissions emanating from other boreholes 11. Such acoustic emissions may arise from drilling operations or acoustic emitters or both). Ranging measurements made using the acoustic signals may be combined with ranging measurements made using EM signals to obtain more accurate information regarding the relative locations of boreholes 11 and of equipment located in boreholes 11.

The known depths of receivers 28, transmitters 29 and downhole tools 13 in their respective boreholes 11 may be used in determining the configuration. As time progresses the positions of some or all of receivers 28, transmitters 29 and downhole tools 13 in their respective wellbores may change. Distance measurements may be repeated for different positions of these endpoint devices in their respective boreholes. As time progresses the collection of distance measurements can provide increasingly good indications of the relative positions and trajectories of boreholes 11. In some embodiments, trajectory information regarding a borehole 11 is made available (e.g. displayed) as soon as it is obtained. As more measurements are obtained, thereby improving the accuracy of the estimated borehole trajectory the displayed information may be updated. This allows drillers to receive early indication of trends in the borehole trajectory while still having the benefit of refined information as more measurements are obtained and processed.

In some embodiments a system exploits the fact that data from multiple ones of or all of wellbores 11 may pass through surface equipment 45. This provides an opportunity to obtain and disseminate better information about the geology of the area in which the boreholes are being drilled (e.g. to model or map formation bed boundaries in the area). In some embodiments surface equipment 45 provides at least selected received data to surface equipment 64 at multiple wells 11A (all wells 11A that are being drilled in some embodiments). The selected received data may comprise gamma measurements and/or resistivity measurements for example. Where each surface equipment 64 receives gamma and/or resistivity and/or other data as a function of depth in several wells 11 including a well 11 with which surface equipment 64 is associated then surface equipment 64 may process this data and display results based on this data in order to optimize drilling of an associated well 11. Such data may be applied, for example for proactive drill plan modification.

In some embodiments selected received data is provided to a data processing center which may process the selected received data to provide a model or map of relevant geological features in the area. The data processing center may then provide the model or map to computer systems associated with wells 11A. The data processing center may be cloud based, located in proximity to surface equipment 45, located at a facility operated by a company responsible for drilling one or more wells 11A or at any other suitable location.

Surface equipment 45 may share the selected data with a data processing center and/or with computer systems associated with wells 11A using any suitable data-transmission medium including, without limitation: satellite data channels; short-wave radio links; cellular data signals (e.g 3G, 4G, LTE etc.); cables (e.g. wires or optical fibers); wireless links (e.g. links using microwave or other signals to carry data); etc. The data sharing may be provided using a cloud-based platform that permits each entity that requires access to the shared data and/or models and/or maps to access the data using any available technology for accessing the Internet.

In another example embodiment, the collected data 11 is processed and a result of the processing is distributed to surface equipment 64. The result of the processing may, for example, comprise a three-dimensional map indicating formation boundaries and formation characteristics. The map may be used to improve geosteering (i.e. steering trajectories of boreholes 11 being drilled so as to keep the boreholes in desired zones—e.g. within formations that contain oil, gas, or another desired product). In some embodiments data from multiple boreholes is automatically provided by way of surface equipment 45 to commercial geosteering software such as, for example, StarSteer™ available from Rogii of Houston Tex. USA.

A map created as described herein may also be used to assist in planning drilling. To facilitate this, the formation characteristics may include drilling characteristics such as penetration rate, drill bit wear rate or the like. Surface equipment 45 or another system may retrieve at least some information to be included in the map from surface equipment 64.

A map as described herein may be used in compensating for perturbations in time of flight and/or attenuation-based distance measurements as described above.

Geo-data obtained using a system herein may be shared with all drill rigs in a basin to facilitate pro-active predictive drilling operations. This data, which may include, raw data, processed data, maps or models derived from the data etc., may be disseminated via a cloud-based system and/or by other data communication channels as described herein. The disseminated data may optionally include data derived from other studies or models of the basin such as seismic studies or the like. A crew drilling a wellbore in a basin in which other wellbores have already been drilled may be able to use such geo-data to predict the rate of drillbit wear as a function of depth, expected drilling progress (i.e. rate of penetration—ROP) as a function of depth, expected depth at which the wellbore is expected to intercept a particular formation, expected depth at which problem formations may be encountered and so on.

Another aspect of the invention that may be combined with any other technology described herein relates to the case where electromagnetic telemetry signals from a downhole tool are received at an EM telemetry receiver located at or near the surface of a cased borehole. In such cases a well-grounded electrode may be provided at or near to the lower end of the casing. Typically the well-grounded electrode is placed just below the downhole end of the casing.

The well-grounded electrode may take any of a range of forms. For example, the electrode may comprise a tubular structure that is expanded just below the casing to contact walls of the borehole. In addition or in the alternative the electrode may comprise electrically-conductive rods or plates that penetrate through walls of the borehole into surrounding formations.

The EM telemetry receiver may be connected to the well-grounded electrode by way of a cable or other electrical conductor. The cable or other electrical conductor may be routed to the surface along the casing. For example, the cable or other electrical conductor may be built into the casing or may run parallel to the casing up to the surface. An electrical connection to the well-grounded electrode by way of the cable or other electrical conductor could replace or augment a connection to a blowout preventer (BOP).

Figure 10A:
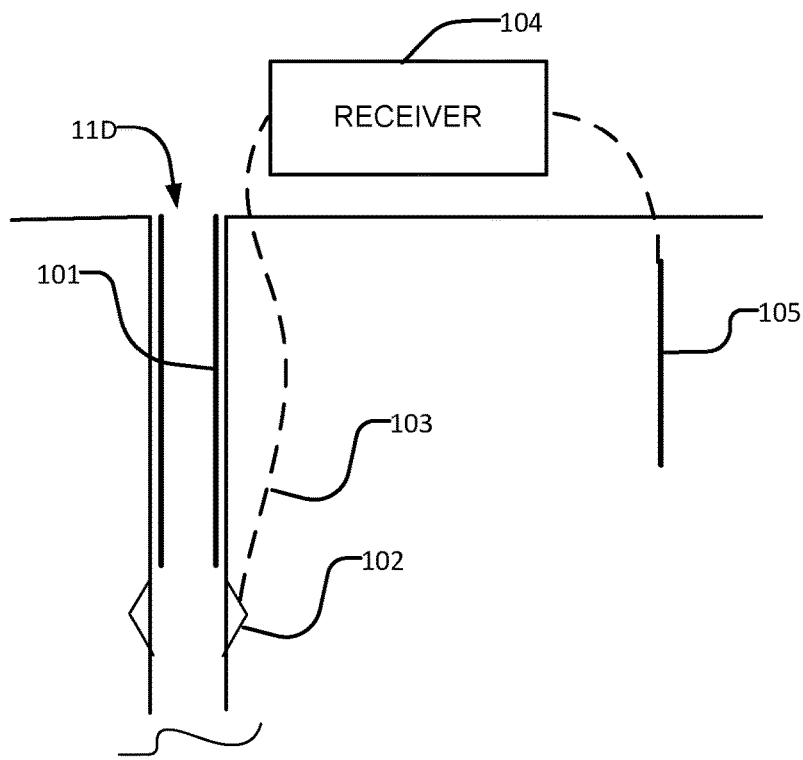
FIGS. 10A, 10B and 10C illustrate a cased borehole having respectively: a grounded electrode near a lower end of the casing, an EM telemetry repeater near a lower end of the casing and an active EM telemetry receiver near a lower end of the casing.

FIG. 10A shows an example borehole 11D having a casing 101 extending into the wellbore for a distance from the surface. An electrode 102 is located at or near a lower end 101A of the casing. An electrical conductor 103 connects electrode 102 to a telemetry receiver 104. Telemetry receiver is also connected to one or more grounded conductors 105.

This construction may improve reception of EM telemetry signals from a downhole tool located in the cased borehole or in another borehole adjacent to the cased borehole. This construction may significantly improve reception of the EM telemetry signal and may allow reception of the electromagnetic telemetry signals when the downhole tool is at a greater depth.

Instead of or in addition to providing a well-grounded electrode at or near the downhole end of a casing an EM telemetry signal repeater may be provided at or near the downhole end of the casing. The EM telemetry signal repeater may comprise repeater circuits comprising an EM telemetry signal receiver, an EM telemetry signal transmitter and circuits connected between the EM telemetry signal receiver and the EM telemetry signal transmitter that cause the EM telemetry signal transmitter to retransmit data received by the EM telemetry signal receiver. The EM telemetry signal repeater may retransmit the same EM telemetry signal that is received or may generate a new signal that carries data from the received EM telemetry signal. Generating a new signal may comprise decoding data from the received EM telemetry signal and subsequently encoding the data in a new EM telemetry signal that may be different from the received EM telemetry signal. For example, the new EM telemetry signal may differ from the received EM telemetry signal in any one or more of:

frequency;
encoding scheme;
bits/cycle;
error correction codes; and/or
error detection codes.

In some embodiments the EM telemetry repeater may be packaged with a form factor of a ring that encircles the borehole. The ring may comprise two or more electrically conductive parts separated from one another by electrically insulating parts. For example, the ring may comprise uphole and downhole electrically conductive rings electrically insulated from one another. First and second outputs of the EM telemetry transmitter and/or first and second inputs of the EM telemetry receiver may be connected respectively to the uphole and downhole electrically conductive rings. Optionally, one output of the EM telemetry transmitter and/or an input of the EM telemetry receiver may be connected to the casing and/or to the well-grounded electrode, if present. Power for the EM telemetry repeater may optionally be provided from the surface by way of cables or other electrical conductors.

Figure 10B:
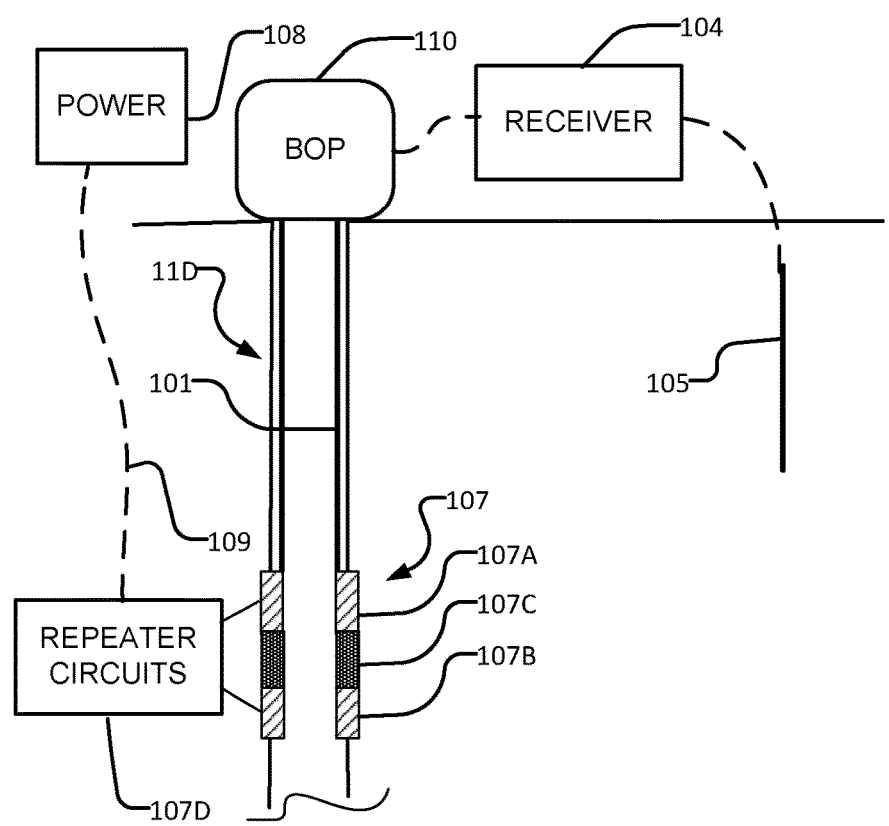

FIG. 10B shows a system similar to that of FIG. 10A in which an EM telemetry repeater 107 is provided near a downhole end of casing 101. Repeater 107 comprises first and second electrical conductors 107A and 107B separated by an electrically insulating portion 107C. In this example, conductors 107A and 107B as well as insulating portion 107C are combined in a structure having a tubular configuration. Repeater circuits 107D are connected between electrical conductors 107A and 107B.

Power from a power supply 108 is delivered to repeater 107 by a cable 109. In the alternative repeater 107 could be powered in some other way, for example by batteries or power generated downhole in any known fashion. In this example, receiver 104 is connected to receive telemetry signals by monitoring potential differences between blow out preventer 110 or casing 101 and one or more grounded electrodes 105.

Instead of or in addition to providing a well-grounded electrode or an EM telemetry repeater at or near the downhole end of a casing, an active EM telemetry receiver may be provided at or near the downhole end of the casing. The active EM telemetry receiver may be constructed in the same manner as an EM telemetry receiver suitable for use in an EM telemetry receiver. However EM telemetry signals detected by the active EM telemetry receiver may be conducted to surface equipment by way of electrical conductors or optical fibers.

Figure 10C:
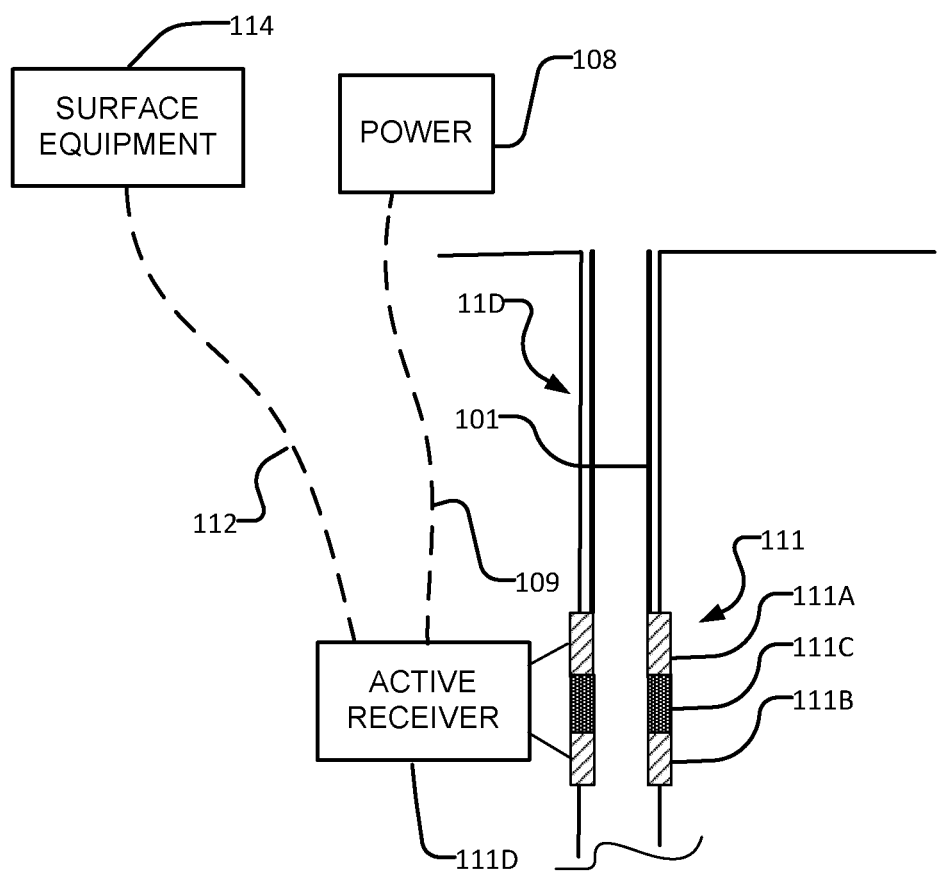

FIG. 10C shows an example case where an active receiver 111 is provided near the downhole end of casing 101. Active receiver 111 includes circuitry that receives power from 1 power supply 108 by way of a cable 109 and delivers data to surface equipment 114 by way of a cable 112. In some embodiments power and data are carried by the same cable.

In some embodiments one or more electrical conductors used as a well grounded electrode and/or as an electrode for receiving or transmitting EM telemetry signals is formed from a downhole end of casing 101. For example, a portion of the downhole end of casing 101 may be expanded or otherwise deformed to provide a well-grounded electrode. This section of the casing may be electrically isolated from other portions of the casing by an electrically insulating gap. The gap may have a structure like that of a gap sub. A wide range of designs for gap subs are known in the art and/or described in the technical and patent literature.

Providing a well-grounded electrode and/or an EM telemetry repeater and/or an active EM telemetry receiver at or near a lower end of a casing may allow a downhole tool from which EM telemetry signals originate to operate at lower power levels and/or higher frequencies than would otherwise be practical.

Downlink signals (from surface equipment to one or more downlink tools 13 may be delivered in any of a wide variety of ways. These include:
- applying an EM telemetry downlink signal between a blowout preventer or casing of a borehole in which a tool 13 is located and one or more grounded conductors (e.g. one or more grounding stakes, rods or plates).
- delivering an EM telemetry downlink signal or data to be included in an EM telemetry downlink signal to a downhole EM telemetry transmitter 29 located in a borehole adjacent to a borehole containing the downhole tool 13 for which the downlink signal is intended. Delivering the EM telemetry signal or data to EM telemetry transmitter 29 may optionally be done by way of one or more conductors in a wireline, an optical fiber, or a wired drill pipe.
- Applying an EM telemetry downlink signal to conductors in one or more boreholes other than the borehole in which the downhole tool 13 is located. The conductors may, for example, comprise electrodes connected to surface equipment by a wireline or other cable and/or casing of the wellbores.

In an example embodiment it is desired to deliver downlink telemetry to a downhole tool 13 at a drilling location where more than one borehole is going to be drilled, In such situations it is typical to drill and case surface portions of the boreholes and then to extend to boreholes. Extending the boreholes may involve directional drilling. It can be desirable to provide two-way telemetry to and from a downhole tool 13 in a borehole that is being extended by directional drilling.

In such cases adjacent boreholes may be available. One or more adjacent boreholes may be used to deliver downlink telemetry signals to the downhole tool 13. If there is only one other borehole sufficiently nearby downlink telemetry signals may be delivered to the downhole tool 13 by applying the downlink EM telemetry signal between a casing or other conductor in the other borehole and one or more grounded conductors. If there are two or more other boreholes sufficiently near to the borehole being drilled then the downlink EM telemetry signal may be applied between electrical conductors (e.g. casings) in two other boreholes.

Using conductors in other boreholes for downlink telemetry to a downhole tool 13 may provide the advantage of significantly greater EM downlink signal penetration into the ground without compromising the safety of a rig associated with the borehole containing the downhole tool 13 (e.g. by avoiding attaching one side of the downlink signal to the BOP of the rig which could cause the rig to become energized with the downlink potential). Delivering the downlink signals away from a rig associated with the borehole in which the downhole tool 13 is located may also increase the signal reception and reliability down hole by reducing noise in the signal.

Figure 11A:
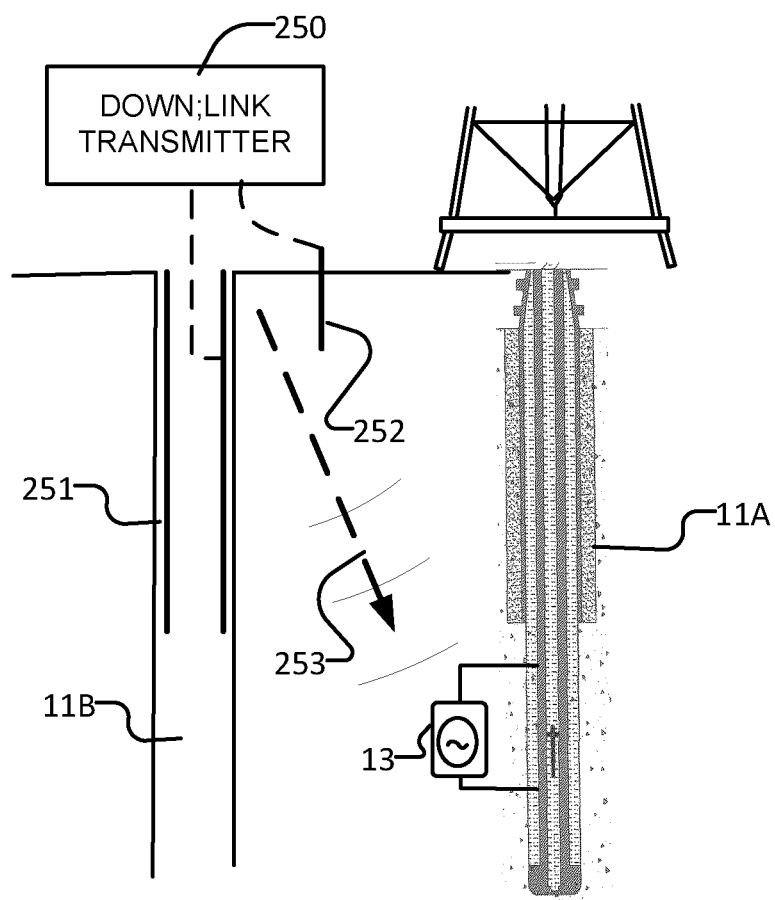
FIGS. 11A and 11B illustrate generating downlink telemetry signals for a downhole tool located in a first borehole by respectively: applying a downlink telemetry signal between a casing in a second borehole and a ground conductor; and applying a downlink telemetry signal between a casing in a second borehole and a casing in a third borehole.

FIG. 11A shows an example case where a downlink EM telemetry signal generator 250 is connected between a casing 251 in a borehole 11B and a grounding stake 252. EM telemetry signals 253 are detected at downhole tool 13 in borehole 11A. Signal generator 250 (which may also be referred to as an EM telemetry transmitter) may, for example, comprise an H-bridge circuit. Outputs of the H-bridge circuit may be connected to casing 251 and grounding stake 252.

Figure 11B:
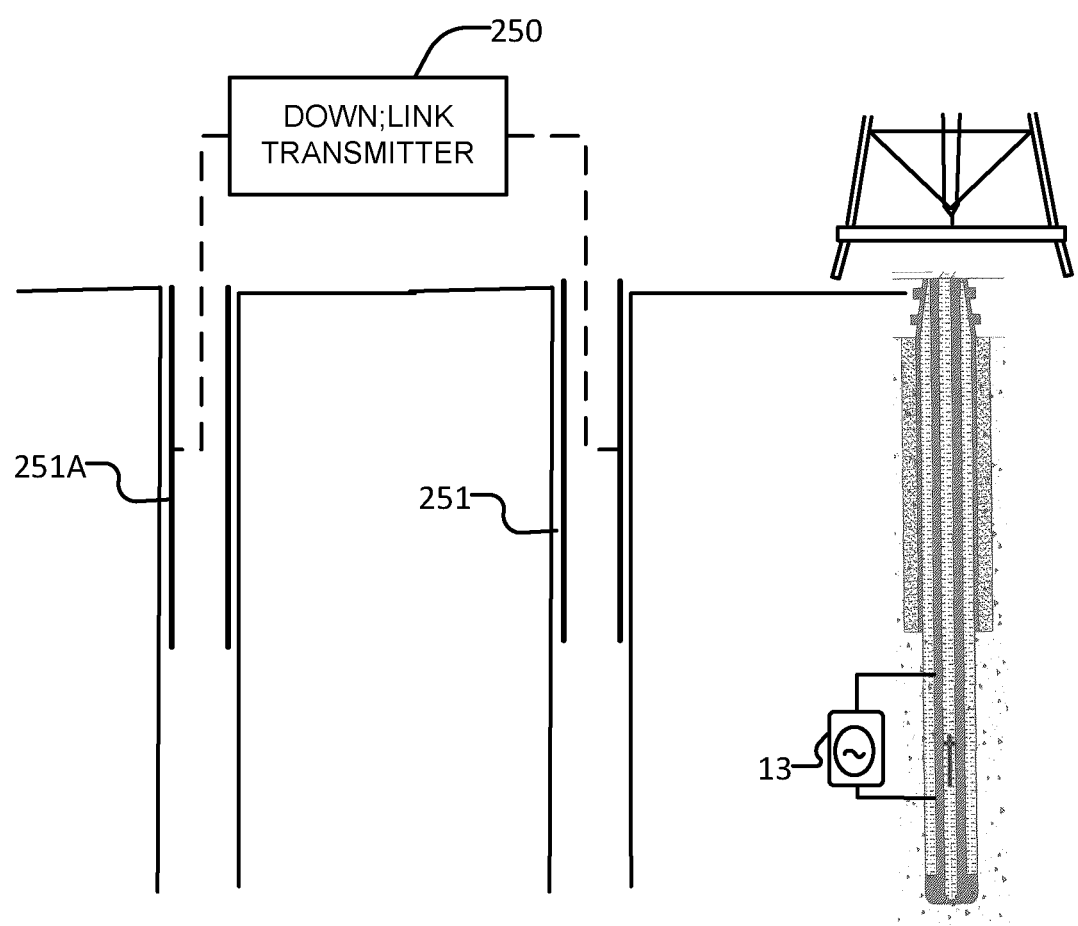

FIG. 11B shows another example embodiment where a downlink EM telemetry signal generator 250 is connected between a casing 251 in a borehole 11B and a casing 251A in a borehole 11C. Signals from downlink transmitter 250 are received at downhole tool 13 in borehole 11A. Boreholes 11B and 11C may be on either side of borehole 11A or on the same side of borehole 11A or may be located at other positions around borehole 11A. Boreholes 11B and 11C may be the same or different distances from borehole 11A.

The technologies as described herein may be combined and/or extended to provide a subterranean data network in which data is transmitted directly between downhole devices (e.g. downhole tools 13, receivers 28 and transmitters 29). One downhole tool 13 may serve to relay data from another downhole tool 13 to a downhole receiver 28 or to relay data from a transmitter 29 to another downhole tool 13. These data communications may be between devices that are all at least 200 meters or at least 500 meters or more below the surface in some cases. Such below-surface data communications may advantageously be exposed to lower electrical noise than would be the case for EM telemetry links ending at surface equipment. Such below-surface data communications may advantageously operate at higher frequencies and/or higher data rates than would be practical for EM telemetry links ending at surface equipment.

A plurality of downhole tools 13 may share one or a few high speed communication links between one or more of the devices and the surface. These communication links may have data rates significantly faster than could be provided by mud pulse telemetry or electromagnetic telemetry from the same depth. In example embodiments the communication link or links offer data rates of at least at least 50 bytes per minute or at least 6000 bytes per minute although data rates provided by the communication links may be much greater than this in some embodiments.

For example, one borehole may include one or more EM signal receivers 28 and one or more EM signal transmitters 29 that are connected to surface equipment using a wired or optical data connection. Data received at the surface which originates at individual downhole tools 13 associated with specific boreholes may be automatically distributed to surface equipment associated with the individual boreholes. Such data may, for example, comprise toolface data or other data useful for guiding directional drilling, well logging data, or other data relating to downhole conditions. Some or all of the data may be applied to control drilling, optionally in a closed loop automated process where drilling parameters such as weight on bit, drill RPM, fluid flow and drill string rotation angle are controlled based on the received data.

In some embodiments of such a system the data may represent data that represents geometry of the boreholes as determined using ranging measurements as described herein. This data may be applied to enhance steering of directional drilling operations.

In some embodiments of such a system the data may comprise measurements made based on electromagnetic or acoustic signals exchanged between different downhole tools in different boreholes. Such data may be indicative of features of the formations lying between the boreholes.

Accumulated data may be made available to surface equipment associated with individual boreholes with or without processing. That data may include information of value to operators of a drill rig such as the expected locations of formation boundaries, expected penetration rates, drilling parameters that have been found to be most effective in other nearby boreholes etc.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

Certain implementations of the invention comprise computer processors which execute software instructions which cause the processors to perform a method of the invention. For example, one or more processors in a drilling system may implement any of the methods described herein by executing software instructions in a program memory accessible to the processors. Such processors may be located, for example, at a receiver 28, a transmitter 29, equipment uphole from receiver 28 and/or transmitter 29, surface equipment, a downhole tool 13, or any combination of these.

Any of the methods described herein may optionally be performed in whole or part by one or more controllers (e.g. a control system for a receiver 28 or downhole tool 13 or any other controller, control system or control module described herein). Such controllers may comprise any suitable device or combination of devices. In some embodiments each controller comprises one or more programmable devices such as one or more devices selected from: CPUs, data processors, embedded processors, digital signal processors, microprocessors, computers-on-a-chip, or the like. The processor(s) may comprise, for example, embedded processors such as dsPIC33 series MPUs (multi-core processing units) available from Microchip Technology Inc. of Chandler, Ariz., USA. These programmable devices are configured by way of software and/or firmware to perform the required controller functions and are interfaced to other parts of the downhole system by way of suitable interfaces. In some embodiments two or more controllers may be implemented in software running on the same processor or set of processors. In addition or in the alternative to the use of programmable devices a controller may comprise logic circuits, which may be hard-wired, provided in custom IC chips, or the like and/or configurable logic such as field-programmable gate arrays (FPGAs).

Each controller may comprise one or more corresponding data stores. A data store may be separate or shared among two or more controllers. The data stores may comprise any suitable devices for storing data and/or software instructions. For example, the data stores may comprise memory chips, memory cards, read only memory (ROM), non-volatile memory, random access memory (RAM), solid-state memory, optical memory, magnetic memory or the like. The data store(s) may contain program code executable by the programmable device(s) to perform functions such as one or more of: encode sensor measurements into telemetry data and to send control signals to telemetry units (e.g. a EM or MP telemetry unit) to transmit telemetry signals to the surface, to optimize reception of telemetry signals as described herein, to measure formation properties as described herein, to measure distances between downhole components etc. The data stores may also or in the alternative include instructions for configuring one or more FPGAs or other configurable logic circuits for performing methods as described herein.

The invention may also be provided in the form of a program product. The program product may comprise any tangible medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, PROMs, EPROMs, flash RAM, or the like. The computer-readable signals on the program product may optionally be compressed or encrypted. Processors configured to execute method steps may be located in downhole equipment (e.g. a downhole tool 13 or a receiver 28) and/or in surface equipment (e.g. surface equipment 45 or 64) and/or in other equipment such as a cloud-based data processing system in data communication with apparatus as described herein.

Interpretation of Terms

Unless the context clearly requires otherwise, throughout the description and the claims:

- "comprise", "comprising", and the like are to be construed in an inclusive sense, as opposed to an exclusive or exhaustive sense; that is to say, in the sense of "including, but not limited to".
- "connected", "coupled", or any variant thereof, means any connection or coupling, either direct or indirect, between two or more elements; the coupling or connection between the elements can be physical, logical, or a combination thereof.
- "herein", "above", "below", and words of similar import, when used to describe this specification shall refer to this specification as a whole and not to any particular portions of this specification.
- "or", in reference to a list of two or more items, covers all of the following interpretations of the word: any of the items in the list, all of the items in the list, and any combination of the items in the list.

the singular forms "a", "an", and "the" also include the meaning of any appropriate plural forms.

"borehole", "wellbore", "well" are used as interchangeable synonyms in this disclosure.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A method for subterranean data communications, the method comprising:
   at a first downhole tool in a first borehole, generating a first electromagnetic signal encoding first data to be communicated;
   at a receiver in a communication borehole distinct from and spaced apart from the first borehole, detecting the first electromagnetic signal;
   at the receiver delivering the detected first electromagnetic signal or first data extracted from the detected first electromagnetic signal to equipment uphole from the receiver;
   operating a second downhole tool in a second borehole distinct from the first borehole and the communication borehole to generate a second electromagnetic signal encoding second data to be communicated, wherein the second electromagnetic signal has a different frequency from the first electromagnetic signal;
   at the receiver in the communication borehole detecting the second electromagnetic signal; and
   delivering the second electromagnetic signal or the second data from the receiver to the equipment uphole from the receiver.

2. The method according to claim 1 comprising delivering the first electromagnetic signal from the receiver to the equipment uphole from the receiver and extracting the first data from the first electromagnetic signal at the equipment uphole from the receiver.

3. The method according to claim 1 wherein the method comprises processing the first electromagnetic signal at the receiver to extract the first data and delivering the first data from the receiver to the equipment uphole from the receiver.

4. The method according to claim 1 comprising, at the receiver, converting the first electromagnetic signal to a digital signal using an analog to digital converter.

5. The method according to claim 1, comprising delivering the first data from the equipment uphole from the receiver to first surface equipment associated with a first drill string in the first borehole.

6. The method according to claim 5 wherein the first data includes first toolface data for the first drillstring and the method comprises displaying all or part of the first toolface data at the first surface equipment.

7. The method according to claim 1, comprising monitoring the detected first electromagnetic signal and moving the receiver along the communication borehole in response to the monitoring to increase one or more of an amplitude and a signal to noise ratio of the detected first electromagnetic signal.

8. The method according to claim 7 wherein the receiver is supported by a wireline and moving the receiver along the communication borehole comprises raising or lowering the wireline.

9. The method according to claim 7 comprising moving the first downhole tool along the first borehole and moving the receiver along the communication borehole is performed in responses to changes in the detected first electromagnetic signal resulting from the moving of the first downhole tool.

10. The method according to claim 1, wherein the receiver is one of a plurality of receivers in the communication borehole and the method comprises detecting the first electromagnetic signal at one or more of the plurality of receivers, determining a quality of the electromagnetic signal detected at each of the one or more of the plurality of receivers and, based on the quality selecting one of the plurality of receivers for detecting the first electromagnetic signal.

11. The method according to claim 1, comprising varying one or more transmission parameters for the first electromagnetic signal to optimize the detection of the first electromagnetic signal wherein the transmission parameters include one or more of amplitude and frequency of the first electromagnetic signal.

12. The method according to claim 1, comprising:
   delivering downlink data to be communicated to the downhole tool to an electromagnetic telemetry transmitter in the communication borehole;
   using the electromagnetic telemetry transmitter, generating a downlink electromagnetic signal encoding the downlink data; and
   at the first downhole tool, detecting the downlink electromagnetic signal and recovering the downlink data.

13. The method according to claim 1, wherein the first electromagnetic signal has a frequency of at least 30 Hz.

14. The method according to claim 1 comprising extending the first borehole while generating the first electromagnetic signal.

15. The method according to claim 1 comprising delivering the first data or the first electromagnetic signal from the receiver to the equipment uphole from the receiver by way of a multi-conductor wireline.

16. The method according to claim 15, wherein the wireline comprises at least one conductor concurrently supplying electrical power to the receiver and delivering data from the receiver to the equipment uphole from the receiver.

17. The method according to claim 1, comprising delivering the first data or the first electromagnetic signal from the receiver to the equipment uphole from the receiver by way of a wired drill pipe system.

18. The method according to claim 1, delivering the first data or the first electromagnetic signal from the receiver to the equipment uphole from the receiver by way of an acoustic telemetry signal.

19. The method according to claim 1, delivering the first data or the first electromagnetic signal from the receiver to the equipment uphole from the receiver by way of an optical fiber.

20. The method according to claim 1, comprising delivering the first data or the first electromagnetic signal from the receiver to the equipment uphole from the receiver at a data rate of at least 50 bytes per minute.

21. The method according to claim 1, comprising delivering the first data or the first electromagnetic signal from the receiver to the equipment uphole from the receiver at a data rate of at least 6000 bytes per minute.

22. The method according to claim 1, comprising:
at the receiver, decoding the first and second electromagnetic signals to extract the first and second data respectively; and
delivering the first and second data from the receiver to the equipment uphole from the receiver.

23. The method according to claim 1 comprising delivering the first and second data respectively to first and second surface equipment respectively associated with the first and second boreholes.

24. The method according to claim 1 wherein the receiver comprises a plurality of electrodes and the receiver is configured to select a first pair of the electrodes for receiving the first electromagnetic signal and a second pair of the electrodes for receiving the second electromagnetic signal.

25. The method according to claim 24, wherein selecting the first and second pairs of electrodes comprises respectively connecting the first and second pairs of electrodes to inputs of first and second difference amplifiers using electrically-controlled switches.

26. The method according to claim 1, comprising varying frequencies of the first and second electromagnetic signals to optimize detection of the first and second electromagnetic signals.

27. The method according to claim 1, comprising adjusting locations of two or more electrodes used to detect the first and second electromagnetic signals in the communication borehole to optimize detection of the first and second electromagnetic signals.

28. The method according to claim 1 comprising:
delivering downlink data to be communicated downhole to a transmitter in the communication borehole;
using the transmitter, generating a downlink electromagnetic signal encoding the data; and
detecting the downlink electromagnetic signal at least at the first downhole tool.

29. The method according to claim 1 comprising determining a range between one or more locations in the communications borehole and one or more locations in the first borehole.

30. The method according to claim 29 wherein determining the range comprises monitoring the attenuation of received EM signals that have been transmitted in either direction between the downhole tool and a location of the signal receiver.

31. The method according to claim 1 wherein the communication borehole is smaller in diameter than the first borehole.

32. A method for subterranean data communications, the method comprising:
at a first downhole tool in a first borehole, generating a first electromagnetic signal encoding first data to be communicated;
at a receiver in a communication borehole distinct from and spaced apart from the first borehole, detecting the first electromagnetic signal; and
at the receiver delivering the detected first electromagnetic signal or first data extracted from the detected first electromagnetic signal to equipment uphole from the receiver;
wherein the receiver comprises a plurality of electrically conductive elements and detecting the first electromagnetic signal comprises measuring a time-varying potential difference between a pair of the plurality of electrically-conductive elements;
processing the first electromagnetic signal at the receiver to extract the first data and delivering the first data from the receiver to the equipment uphole from the receiver; and
at the receiver, comparing the extracted first data with data verification information encoded in the first electromagnetic signal.

33. The method according to claim 32 comprising if the extracted first data does not match the data verification information, at the receiver automatically controlling an EM telemetry transmitter in the communication borehole to transmit an error signal, the method further comprising, detecting the error signal at the downhole tool and retransmitting the first electromagnetic signal.

34. A method for subterranean data communications, the method comprising:
at a first downhole tool in a first borehole, generating a first electromagnetic signal encoding first data to be communicated;
at a receiver in a communication borehole distinct from and spaced apart from the first borehole, detecting the first electromagnetic signal;
at the receiver delivering the detected first electromagnetic signal or first data extracted from the detected first electromagnetic signal to equipment uphole from the receiver;
delivering downlink data to be communicated to the downhole tool to an electromagnetic telemetry transmitter in the communication borehole;
using the electromagnetic telemetry transmitter, generating a downlink electromagnetic signal encoding the downlink data;
at the first downhole tool, detecting the downlink electromagnetic signal and recovering the downlink data;
at the first downhole tool, monitoring signal quality of the downlink electromagnetic signal; and based on the monitored signal quality of the downlink electromagnetic signal, adjusting values of one or more transmission parameters used to generate the first electromagnetic signal.

35. The method according to claim 34 wherein the transmission parameters include one or more of frequency of the first electromagnetic signal, amplitude of the first electromagnetic signal, and encoding scheme used to encode the first data in the first electromagnetic signal.

36. The method according to claim 34, wherein the first electromagnetic signal and the downlink electromagnetic signal have different frequencies.

37. A method for subterranean data communications, the method comprising:
at a first downhole tool in a first borehole, generating a first electromagnetic signal encoding first data to be communicated;
at a receiver in a communication borehole distinct from and spaced apart from the first borehole, detecting the first electromagnetic signal;
at the receiver delivering the detected first electromagnetic signal or first data extracted from the detected first electromagnetic signal to equipment uphole from the receiver;
delivering downlink data to be communicated downhole to a transmitter in the communication borehole;
using the transmitter, generating a downlink electromagnetic signal encoding the data;
detecting the downlink electromagnetic signal at least at the first downhole tool;
at the first downhole tool, monitoring signal quality of the downlink electromagnetic signal; and
based on the signal quality of the downlink electromagnetic signal adjusting parameters for transmission of the first electromagnetic signal.

38. A method for subterranean data communications, the method comprising:
at a first downhole tool in a first borehole, generating a first electromagnetic signal encoding first data to be communicated;
at a receiver in a communication borehole distinct from and spaced apart from the first borehole, detecting the first electromagnetic signal;
at the receiver delivering the detected first electromagnetic signal or first data extracted from the detected first electromagnetic signal to equipment uphole from the receiver; and
determining a time of flight for electromagnetic signals propagating between one or more locations in the communications borehole and one or more locations in the first borehole.

39. The method according to claim 38 comprising triangulating relative locations of the downhole tool and the receiver based on plural time of flight measurements.

40. A method for subterranean data communications, the method comprising:
at a first downhole tool in a first borehole, generating a first electromagnetic signal encoding first data to be communicated;
at a receiver in a communication borehole distinct from and spaced apart from the first borehole, detecting the first electromagnetic signal;
at the receiver delivering the detected first electromagnetic signal or first data extracted from the detected first electromagnetic signal to equipment uphole from the receiver;
operating a second downhole tool in a second borehole distinct from the first borehole and the communication borehole to generate a second electromagnetic signal encoding second data to be communicated;
selecting first and second receivers out of a plurality of receivers in the communication borehole to detect the first and second electromagnetic signals respectively;
at the first selected receiver detecting the first electromagnetic signal;
at the second selected receiver detecting the second electromagnetic signal; and
delivering the second electromagnetic signal or the second data from the receiver to the equipment uphole from the receiver.

41. The method according to claim 40 wherein the second electromagnetic signal has a different frequency or frequencies than the first electromagnetic signal.

42. The method according to claim 41, wherein the first and second electromagnetic signals each comprise frequencies of at least 30 Hz.

43. A method for subterranean data communications, the method comprising:
at a first downhole tool in a first borehole, generating a first electromagnetic signal encoding first data to be communicated;
at a receiver in a communication borehole distinct from and spaced apart from the first borehole, detecting the first electromagnetic signal;
at the receiver delivering the detected first electromagnetic signal or first data extracted from the detected first electromagnetic signal to equipment uphole from the receiver; and
determining a range between one or more locations in the communications borehole and one or more locations in the first borehole;
wherein determining the range comprises monitoring how the phases of received signals vary with frequency.

* * * * *